US010762680B1

(12) United States Patent
Amirghodsi et al.

(10) Patent No.: US 10,762,680 B1
(45) Date of Patent: Sep. 1, 2020

(54) GENERATING DETERMINISTIC DIGITAL IMAGE MATCHING PATCHES UTILIZING A PARALLEL WAVEFRONT SEARCH APPROACH AND HASHED RANDOM NUMBER

(71) Applicant: Adobe Inc., San Jose, CA (US)

(72) Inventors: Sohrab Amirghodsi, Seattle, WA (US);
Connelly Barnes, Seattle, WA (US);
Eric L. Palmer, Folsom, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/363,839

(22) Filed: Mar. 25, 2019

(51) Int. Cl.
| | |
|---|---|
| *G06T 11/60* | (2006.01) |
| *G06T 1/20* | (2006.01) |
| *G06T 5/50* | (2006.01) |
| *G06T 5/00* | (2006.01) |
| *G06T 7/11* | (2017.01) |

(52) U.S. Cl.
CPC .............. *G06T 11/60* (2013.01); *G06T 1/20* (2013.01); *G06T 5/005* (2013.01); *G06T 5/50* (2013.01); *G06T 7/11* (2017.01)

(58) Field of Classification Search
None
See application file for complete search history.

(56) References Cited

U.S. PATENT DOCUMENTS

| | | | | |
|---|---|---|---|---|
| 9,554,133 | B2* | 1/2017 | Ye | ........................ H04N 19/162 |
| 9,710,898 | B2 | 7/2017 | Amirghodsi et al. | |
| 2008/0152225 | A1 | 6/2008 | Iwamoto | |
| 2010/0104158 | A1 | 4/2010 | Shechtman et al. | |
| 2012/0088981 | A1 | 4/2012 | Liu et al. | |
| 2012/0155766 | A1 | 6/2012 | Zhang et al. | |
| 2012/0230591 | A1* | 9/2012 | Shibata | ................ H04N 1/4097 382/195 |
| 2013/0121417 | A1* | 5/2013 | Chong | ................ H04N 19/159 375/240.15 |
| 2014/0161362 | A1 | 6/2014 | Cao et al. | |
| 2014/0205186 | A1 | 7/2014 | Cao et al. | |
| 2016/0042516 | A1 | 2/2016 | Tieu et al. | |
| 2016/0100191 | A1* | 4/2016 | Mishra | ................ H04N 19/182 375/240.12 |

(Continued)

FOREIGN PATENT DOCUMENTS

EP        2209090 A1        7/2010

OTHER PUBLICATIONS

U.S. Appl. No. 15/906,783, filed Dec. 13, 2019, Office Action.

(Continued)

*Primary Examiner* — Xin Sheng
(74) *Attorney, Agent, or Firm* — Keller Jolley Preece

(57) ABSTRACT

The present disclosure relates to systems, methods, and non-transitory computer readable media for generating deterministic enhanced digital images based on parallel determinations of pixel group offsets arranged in pixel waves. For example, the disclosed systems can utilize a parallel wave analysis to propagate through pixel groups in a pixel wave of a target region within a digital image to determine matching patch offsets for the pixel groups. The disclosed systems can further utilize the matching patch offsets to generate a deterministic enhanced digital image by filling or replacing pixels of the target region with matching pixels indicated by the matching patch offsets.

20 Claims, 14 Drawing Sheets

(56) References Cited

U.S. PATENT DOCUMENTS

| | | |
|---|---|---|
| 2017/0039723 A1 | 2/2017 | Price et al. |
| 2018/0121754 A1 | 5/2018 | Carr et al. |
| 2019/0042875 A1 | 2/2019 | Carr et al. |

OTHER PUBLICATIONS

U.S. Appl. No. 15/342,793, filed Sep. 16, 2019, Notice of Allowance.

U.S. Appl. No. 16/148,166, filed Sep. 11, 2019, Notice of Allowance.

Barnes, C., Shechtman, E., Finkelstein, A., and Goldman, D. B. Aug. 2009. Patchmatch: A randomized correspondence algorithm for structural image editing. In ACM SIGGRAPH 2009 Papers, ACM, New York, NY, USA, SIGGRAPH '09, 24:1-24:11.

Barnes, C., Shechtman, E., Goldman, D. B., and Finkelstein, A. Sep. 2010. The generalized PatchMatch correspondence algorithm. In European Conference on Computer Vision.

Barnes, C., Zhang, F.-L., Lou, L., Wu, X., and Hu, S.-M. Aug. 2015. Patchtable: Effcient patch queries for large datasets and applications. In ACM Transactions on Graphics (Proc. SIGGRAPH).

Liu, Siying, et al. "PatchMatch-based automatic lattice detection for near-regular textures." Proceedings of the IEEE International Conference on Computer Vision. 2015.

Li, Yu, et al. "Spm-bp: Sped-up patchmatch belief propagation for continuous mrfs." Proceedings of the IEEE International Conference on Computer Vision. 2015.

Muller, Oliver, Michael Ying Yang, and Bodo Rosenhahn. "Slice sampling particle belief propagation." Proceedings of the IEEE International Conference on Computer Vision. 2013.

Search Report as received in GB 1711706.0 dated Jan. 15, 2018.

U.S. Appl. No. 15/342,793, filed Jul. 3, 2018, Notice of Allowance.

U.S. Appl. No. 15/342,793, filed Jan. 11, 2019, Office Action.

U.S. Appl. No. 16/148,166, filed Jan. 11, 2019, Office Action.

U.S. Appl. No. 15/906,783, filed May 1, 2020, Office Action.

\* cited by examiner

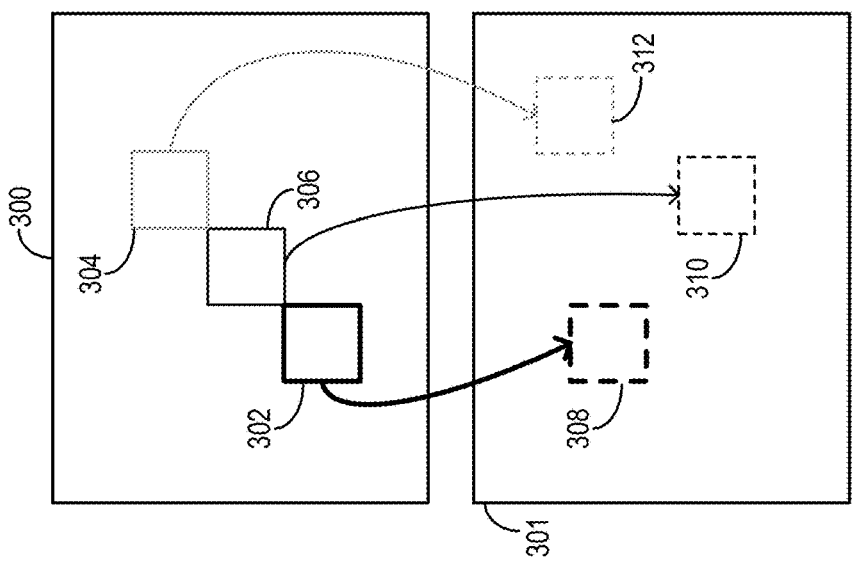
Fig. 3A Initialization
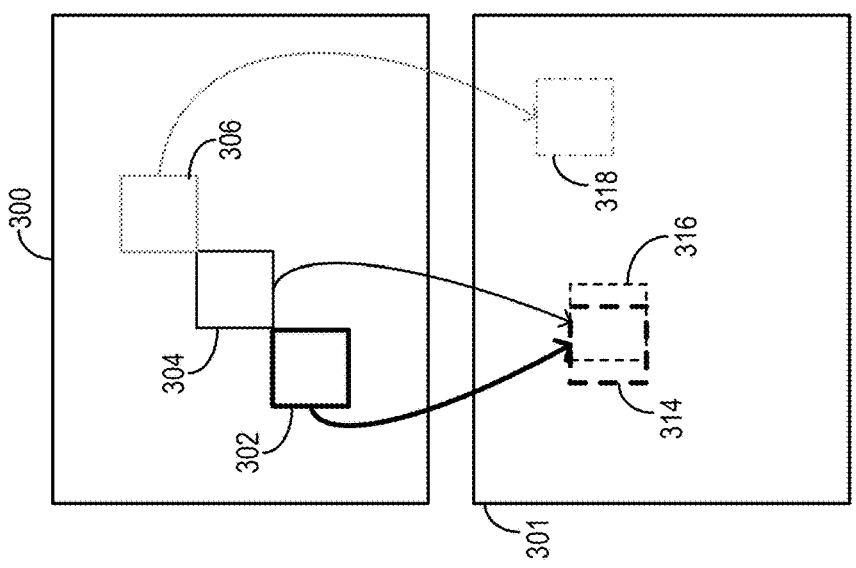
Fig. 3B Propagation
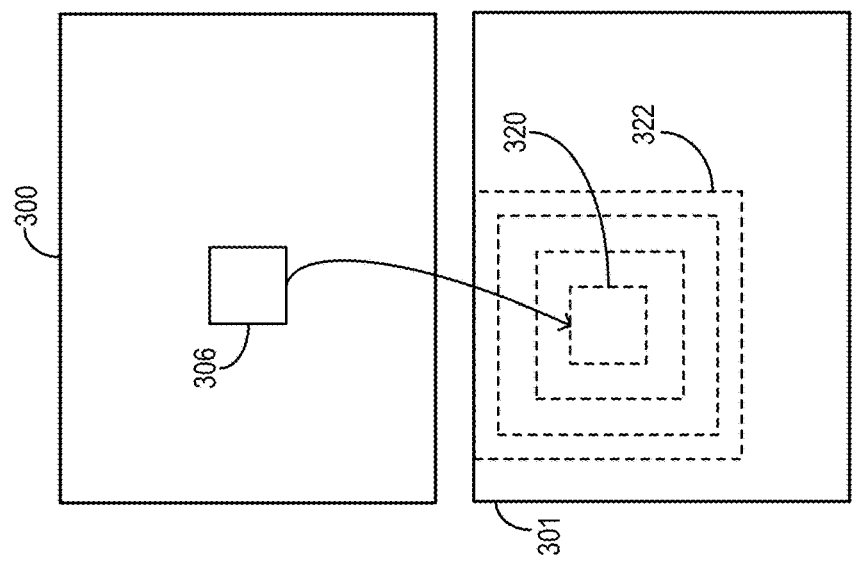
Fig. 3C Search

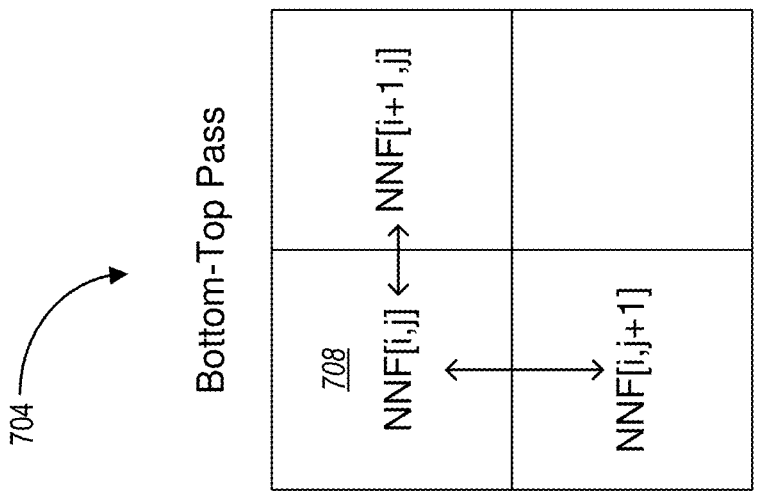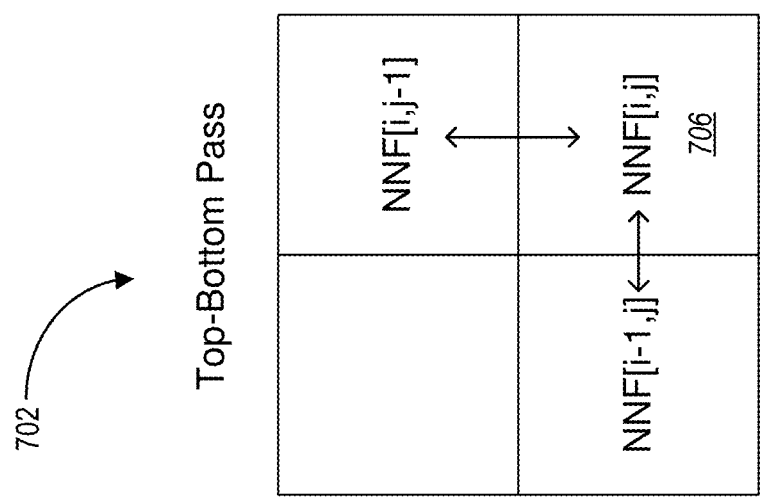
Fig. 7

US 10,762,680 B1

GENERATING DETERMINISTIC DIGITAL IMAGE MATCHING PATCHES UTILIZING A PARALLEL WAVEFRONT SEARCH APPROACH AND HASHED RANDOM NUMBER

BACKGROUND

Advancements in computing devices and digital image editing technology have led to a variety of innovations in providing tools for managing and editing digital images. For example, digital image editing systems are now able to analyze a digital image to identify matching patches within the digital image. Based on this analysis, modern digital image editing systems are also able to modify the digital image by filling a particular target region of the digital image based on the identified matching patches. For instance, conventional digital image editing systems can utilize a randomized search analysis to determine matching patches and fill target regions.

Despite these advances however, conventional digital image editing systems continue to suffer from a number of disadvantages in relation to reliability, flexibility, accuracy, and efficiency. For example, although many conventional digital image editing systems can fill a target region of a digital image, the systems rely on randomized searching and are therefore non-deterministic. Indeed, in identifying and propagating matching patch values through a region of a digital image, conventional systems generate outputs that vary from run to run such that, even based on non-varying identical input, the outputs are nevertheless unpredictable and non-deterministic. As a result, it is nearly impossible to use patch matching to recreate consistent, identical edited digital images using a conventional digital image editing system.

In addition, while conventional digital image editing systems can identify matching portions of a digital image, these systems are often inaccurate. For example, conventional systems often fill a region of a digital image with inaccurate matching patches. This can occur, for example, when conventional systems apply propagation algorithms that propagate inaccurate or outdated matching patch values to pixels within a region. For instance, conventional digital image editing systems often divide a target region into different segments and then propagate matching patch offsets within each segment. This approach, however, often results in inaccurately propagating values calculated during previous propagation iterations to pixels within the individual segments (e.g., propagating values from previous iterations in analyzing edges of a segment).

Some conventional digital image editing systems have sought to avoid this result by analyzing an entire target region of a digital image (rather than dividing the target region into segments). This approach, however, is extremely inefficient with regard to time and computer processing power because it precludes application of parallel analysis techniques. Generating and propagating matching patch values across a target region without the use of parallel processing techniques can exponentially increase the amount of time and computer resources to fill a target region within a digital image with matching patches. Indeed, without parallelism, real-time interactive user interface filling of a target region in a digital image is nearly impossible.

Moreover, even conventional digital image editing systems that utilize parallel matching patch analysis are still computationally expensive. Indeed, even when dividing a target region into segments, conventional digital image editing systems can still require a significant draw in computing resources to fill a target region and generate a modified digital image. Further, conventional systems cannot take full advantage of computing power via parallel processing to produce deterministic results regardless of the random aspect of identifying matching patches. In addition, conventional digital image editing systems that utilize parallel matching patch analysis are more computationally efficient but are not accurate or deterministic.

Thus, there are several disadvantages with regard to conventional digital image editing systems.

SUMMARY

One or more embodiments described herein provide benefits and solve one or more of the foregoing or other problems in the art with systems, methods, and non-transitory computer readable media that generate deterministic enhanced digital images based on parallel wavefront matching patch search for pixel groups within a target region of an input digital image. Indeed, by utilizing hash-based random uniform sampling, the disclosed system can utilize deterministic search offsets in generating enhanced digital images. Moreover, by using a wavefront search approach (i.e., computations in the form of an acyclic graph), the disclosed systems can simultaneously determine matching patch offsets for multiple pixel groups in parallel within a target region of a digital image. Because the disclosed systems can utilize deterministic search offsets, the disclosed systems can generate consistent, deterministic enhanced digital images that can be repeatedly generated using the same inputs. In addition, because the disclosed systems can analyze wavefront pixel groups in parallel, the disclosed systems can propagate accurate matching patch offsets, which improves the accuracy of each iteration and the ultimate enhanced digital image. Furthermore, by analyzing pixel groups in parallel using a wavefront approach, the disclosed systems can fill target regions and generate enhanced digital images in interactive user interfaces in real-time (or near real-time). Indeed, the disclosed systems can generate enhanced digital images up to 6.5 times faster relative to conventional systems that utilize non-parallel analysis techniques.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3A illustrates an initialization operation in accordance with one or more embodiments;

FIG. 3B illustrates a propagation operation in accordance with one or more embodiments;

FIG. 3C illustrates a search operation in accordance with one or more embodiments;

FIG. 7 illustrates data dependencies between pixel groups in accordance with one or more embodiments;

DETAILED DESCRIPTION

Figure 1:
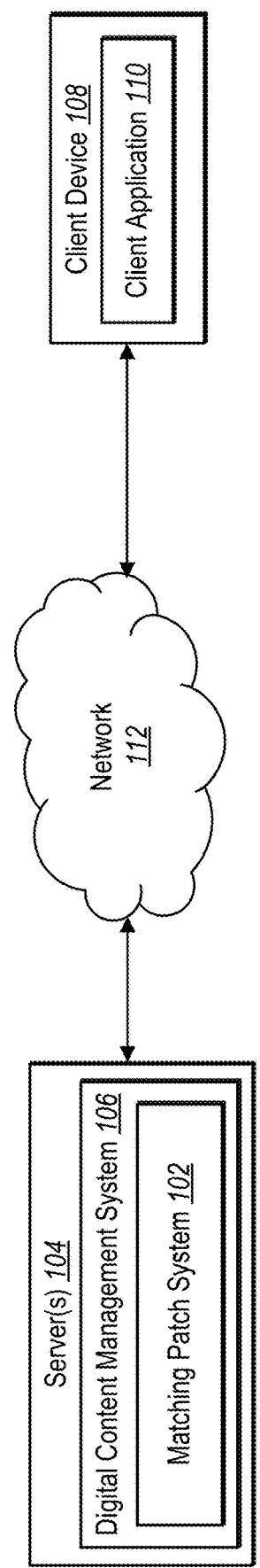
FIG. 1 illustrates an example environment for implementing a matching patch system in accordance with one or more embodiments.

One or more embodiments described herein provide benefits and solve one or more of the foregoing or other problems in the art with a matching patch system that generates a deterministic enhanced digital image by filling a target region of a digital image utilizing a deterministic random search algorithm together with wavefront parallel processing of pixel groups within the target region. The matching patch system can search for patches of a digital image to fill or replace the target region (e.g., a region that is missing, blurry, or otherwise undesirable) to generate an enhanced digital image. To find accurate patches to fill the target region, the matching patch system can perform a parallel wavefront analysis in relation to pixel group lines within the target region. This parallel wavefront approach not only improves accuracy, but significantly reduces computer processing power and time required to generate enhanced digital images. Additionally, in one or more embodiments the matching patch system also utilizes a hash-based random search algorithm to locate replacement or substitute pixels for pixel groups of the target region in a deterministic manner. Accordingly, the matching patch system can efficiently generate consistent enhanced digital images that fill or replace a target region with accurate matching patches.

To fill or replace a target region of a digital image (e.g., a target region selected by a user), the matching patch system can identify matching (i.e., visually similar) portions of the same digital image or a different digital image to substitute for portions of the target region. Particularly, in one or more embodiments the matching patch system determines matching patch offsets (e.g., nearest neighbor fields or "NNFs") for pixel groups of the target region. For example, matching patch offsets can include transformations that point to corresponding pixel groups within a digital image that can replace pixel groups of the target region. The matching patch system can determine a variety of matching patch offsets in filling a target region and generating enhanced digital images. For example, in one or more embodiments the matching patch system utilizes matching patch offsets that including translations, rotations, scales, and/or other transformations that point to replacement pixel groups (i.e., matching patches) within a digital image.

As referenced above, to process the digital image and replace pixels of the target region with more suitable matching pixels, the matching patch system can identify pixel groups within a target region (e.g., individual pixels or two-by-two blocks of pixels). In addition, the matching patch system can arrange and/or analyze the pixel groups along lines within the target region. For example, in one or more embodiments the matching patch system identifies a first set of pixel groups along a first pixel wave within the target region of the digital image and can identify a second set of pixel groups along a second pixel wave within the target region of the digital image. In some embodiments, the matching patch system analyzes pixel groups arranged in diagonal pixel waves that are adjacent to one another. By analyzing pixel groups along pixel waves in this manner, the matching patch system can perform a parallel wave analysis (i.e., a wavefront propagation analysis) to process pixel groups along the same pixel wave in parallel (e.g., multiple blocks at a time) using multiple threads of a processor.

To determine matching patch offsets for the pixel groups, in one or more embodiments the matching patch system performs an initialization operation, a propagation operation, and a random search operation. The matching patch system can perform each of these operations as part of a wavefront search for each pixel wave within a target region. This wavefront approach analyzes each pixel wave in parallel (thus improving efficiency) while looking to the most recently updated pixel waves to search for corresponding matching patch offset (thus improving accuracy). Thus, the pixel groups in each pixel wave depend from adjacent pixel groups (e.g., an element directly above and an element directly left when the wave moves from upper left to bottom right). Because of this arrangement, the computations form an acyclic graph.

To illustrate, in one or more embodiments the matching patch system performs an initialization of a target region of a digital image by determining initial offsets (e.g., nearest neighbor fields or "NNFs") for each of the separate pixel groups within a pixel wave. For example, the matching patch system can determine, for each pixel group, an offset that indicates a corresponding pixel group in a different location of the same digital image or a different digital image. In some embodiments, the matching patch system utilizes a random initialization algorithm to determine offsets at random locations. For instance, the matching patch system can utilize a hash-based random initialization algorithm to determine offsets that are random but also deterministic (i.e., repeatable) for each pixel group in a pixel wave.

As also mentioned, once the pixel groups of the target region are initialized, the matching patch system can further utilize a propagation technique as part of identifying matching portions to fill or replace portions of the target region. To elaborate, in some embodiments the matching patch system identifies, in parallel for multiple pixel groups along a particular pixel wave, one or more corresponding propagation offsets. For a given pixel group, for instance, the matching patch system can identify offsets of pixel groups along a different pixel wave within the target region as propagation offsets. More particularly, in one or more embodiments for the given pixel group the matching patch system identifies propagation offsets from pixel groups in a previously-propagated pixel wave. To illustrate, for a given pixel group, the matching patch system can look to a first pixel group above the given pixel group and a pixel group to the left of the given pixel group. Because the first pixel group and the second pixel group belong to a different pixel wave (e.g., a previously-propagated pixel wave), the matching patch system can propagate these values to the given pixel group with the most up-to-date and accurate propagation offsets. Because the matching patch system looks to these previously propagated pixel groups (e.g., creating dependencies to pixel groups above and to the left of any individual pixel group), the computations are in the form of an acyclic graph.

In addition to this propagation technique, the matching patch system can perform a random search operation in parallel for multiple pixel groups along a given pixel wave within the target region of the digital image. Particularly, in some embodiments the matching patch system determines, for a given pixel group along a pixel wave, a corresponding search offset within a search area of a digital image. To elaborate, in one or more embodiments the matching patch system applies a hash-based random search algorithm to a unique computation key to randomly (but deterministically) identify deterministic search offsets that the matching patch system can utilize to sample offsets from the search area. As a result of using a hash-based random search algorithm and a unique computation key, the matching patch system can generate search offsets from locations of the search area that are random but deterministic.

The matching patch system can further compare different matching patch offsets and select the most accurate matching patch offset for a particular pixel group. For example, in some embodiments the matching patch system compares initial offsets, propagation offsets, and search offsets to identify a matching patch offset for pixel groups within the target region. Indeed, based on the initialization, propagation, and random search operations of the matching patch system, the matching patch system can determine (in parallel) matching patch offsets for each pixel group in a pixel wave of a target region. In addition, in one or more embodiments the matching patch system replaces the pixel groups of the target region with the pixel groups corresponding to the determined matching patch offsets. Thus, by replacing the pixel groups with corresponding matching pixel groups, the matching patch system can fill or replace the target region to generate a deterministic enhanced digital image.

The matching patch system provides several advantages over conventional systems. For example, as just discussed the matching patch system can generate consistent results. More specifically, the matching patch system can generate deterministic matching patch offsets for individual pixel groups and uses the deterministic matching patch offsets to generate deterministic enhanced digital images. To generate deterministic enhanced digital images, the matching patch system can implement a hash-based random search algorithm to sample from random but deterministic search areas for search offsets. Thus, unlike conventional digital image editing systems that generate different digital images from run to run (i.e., different output images based on the same input image and same target region), the matching patch system can generate enhanced digital images that are deterministic (i.e., the same from run to run). Generating deterministic results further improves the application of the matching patch system in interactive settings, where a user can, for example, apply an image editing tool to fill a target region in a predictable, consistent way.

In addition, the matching patch system provides greater accuracy than conventional digital image editing systems. Indeed, the matching patch system can generate enhanced digital images with filled or replaced target regions that are better matched or more visually similar to the overall appearance of the digital image than enhanced digital images generated by conventional systems. Indeed, due at least in part to the fact that the matching patch system utilizes a parallel wavefront analysis to determine offsets for pixel groups based on previously-propagated lines of pixel groups, the matching patch system can determine offsets more accurately than conventional digital image editing systems.

In addition, the matching patch system is more efficient than many conventional digital image editing systems. For example, compared to conventional systems, the matching patch system more efficiently utilizes capabilities of a computer and more quickly generates matches for target regions. To illustrate, the matching patch system can distribute processing of pixel groups across multiple threads of a processor (e.g., a central processing unit or "CPU" or a graphical processing unit or "GPU") because the matching patch system analyzes pixel groups in such a way that enables parallel determinations of propagation offsets and search offsets for multiple pixel group along a particular pixel wave at a time. Because the matching patch system can analyze multiple pixel groups in parallel, the matching patch system is more compatible with a processor that includes a high number of threads such as a GPU. Indeed, researchers have determined that the matching patch system can run roughly 6.5 times faster for translation offset applications and 2.7 times faster for generalized matching patch offset applications when compared to conventional systems. Due at least in part to the fact that the matching patch system generates matches for target regions (and, in turn, generates enhanced digital images) faster than conventional digital image editing systems, the matching patch system further improves flexibility over conventional systems. For example, the matching patch system is fast enough to generate enhanced digital images in real-time (or near real-time) for a user to interact with a digital image editing tool that utilizes the matching patch system. Moreover, for similarity transform the matching patch system can schedule each NNF separately to overall 25% speed up.

The matching patch system can also improve flexibility in balancing demands of scheduling and parallel calculations. Indeed, by modifying grain size (e.g., size of the pixel groups), the matching patch system can adjust between scheduling overhead (e.g., processing power to schedule parallel processes) and work performance (e.g., processing power and time required to perform the parallel calculations). In some embodiments, a two-by-two square of pixels yields higher performance than other pixel granularities (e.g., for translation search methods). In some embodiments, a pixel group that includes a single pixel can be utilized (e.g., for similarity transform search methods). Indeed, depending on the dimensions of the pixel group, the matching patch system strikes a balance between the amount of work getting done in each pixel wave and the amount of scheduling overhead.

As illustrated by the foregoing discussion, the present disclosure utilizes a variety of terms to describe features and benefits of the matching patch system. Additional detail is hereafter provided regarding the meaning of these terms as used in this disclosure. In particular, the term "pixel group"

refers to a group of one or more pixels within a digital image. Indeed, a pixel group can have a particular size, where the size defines the dimensions and/or number of pixels within the pixel group. Moreover, as described below, the matching patch system can select different sizes based on different search methods (e.g., translation search method or similarity transform search method). A pixel group can further refer to a group of pixels of a variety of shapes (e.g., a circle, a triangle, a square, or a rectangle). In some embodiments, depending on the application of the matching patch system (e.g., a simple translate or a similarity transform), a pixel group refers to a square of pixels such as, for example, a two-by-two square of pixels or a one-by-one square of pixels (i.e., a single pixel).

In addition, the term "target region" refers to a region or portion of a digital image that a user or computer system seeks to fill or replace. Particularly, a target region can refer to a region of a digital image indicated by user input (or automatically determined). A target region can refer to one or more pixel groups within a digital image that are blurry, pixelated, blank, missing, or otherwise undesirable. Additionally, a target region can have a uniform shape and/or uniform dimensions, or a target region can have a non-uniform shape and/or non-uniform dimensions.

As mentioned, the matching patch system can identify pixel groups along different pixel waves within a target region. As used herein, the term "pixel wave" refers to one or more pixel groups arranged in a row, column, or line (or curve) within a target region or other portion of a digital image. Indeed, in some embodiments the matching patch system determines pixel waves including pixel groups diagonally adjacent to one another. Diagonally adjacent pixel groups are effective because propagating through the pixel waves in parallel meets acyclic dependency graph requirements between adjacent elements. Thus, in these embodiments, the individual pixel waves are arranged diagonally within the target region. In other embodiments, the matching patch system determines pixel waves arranged vertically or horizontally or in any other configuration where the computations form an acyclic graph.

As also mentioned, the matching patch system can utilize a parallel wave analysis to determine offsets for pixel groups within a target region of a digital image. As used herein, the term "parallel wave" refers to a type of analysis or a technique of propagating through, and determining offsets for, pixel groups within respective pixel waves. In particular, a parallel wave can refer to a wavefront analysis that the matching patch system uses to determine, in parallel for multiple pixel groups of a given pixel wave at a time, propagation offsets, search offsets, and/or matching patch offsets. For instance, the matching patch system can determine offsets for multiple pixel groups at a time in parallel by loading or assigning the processing of an individual pixel group (e.g., the determination of its offsets) on a particular thread of a processor. Indeed, "parallel" refers to a concurrent processing of data in tandem. For example, parallel can refer to a simultaneous analysis of more than one pixel group from a pixel wave across multiple threads of a processor (e.g., a GPU). For example, in some embodiments, each thread performs the analysis of a separate pixel group in parallel.

Relatedly, the term "offset" refers to an operation or transformation that the matching patch system can apply to identify or locate a pixel group relative to another pixel group within a digital image. Thus, as used herein, the term offset can include any form of patch comparison (e.g., translation or similarity transform) to identify a source for a target. Indeed, an offset refers to a transformation that describes a relationship between a first pixel group and a second pixel group. For example, in some embodiments an offset refers to a nearest neighbor field ("NNF") or some other function that indicates how to locate a second pixel group from a first pixel group. Thus, in relation to a given pixel group, an offset can refer to a translation, rotation, and/or scale defining a transformation between a first pixel group and a second pixel group. As an example, an NNF offset can include one or more elements defined by quintuplets (e.g., <scale, angle, x coordinate, y coordinate, mirror>).

As mentioned, the matching patch system can determine various types of offsets such as initial offsets, propagation offsets, search offsets, and matching patch offsets. A "matching patch offset" refers to an offset that the matching patch system selects for a given pixel group based on comparing one or more initial offsets, one or more propagation offsets, and/or one or more search offsets (e.g., a closest or best match). An "initial offset" refers to an offset that the matching patch system generates or determines based on an initialization process. Similarly, a "propagation offset" refers to an offset that the matching patch system generates or determines based on a propagation process. In addition, a "search offset" refers to an offset that the matching patch system generates based on a search process. Additional detail regarding initialization, propagation, and searching is provided below with reference to the figures.

As mentioned, the matching patch system can generate deterministic enhanced digital images based on utilizing a hash-based random search algorithm. As used herein, the term "hash-based random search algorithm" or "hash-based random search" refers to an algorithm that utilizes a hash function to conduct a search. In particular, to perform a random search, the matching patch system applies a hash function to a unique computation key (e.g., a search key) to generate a value (e.g., a hash code) that indicates a particular location with a search area. Indeed, knowing the hash function enables the matching patch system to generate deterministic results based on a particular input (i.e., unique computation key) without disrupting the random nature of the search. Relatedly, the term "deterministic" (e.g., when used as a modifier) refers to an algorithm, a digital image, or an offset that, given a particular input, is unchanging or identical (e.g., across multiple runs or iterations). Thus, after a generating a particular search offset via a first implementation of a deterministic random search algorithm based on particular input, the matching patch system can generate the same search offset based on subsequent implementations. The input (e.g., the search key) and the hash-based random search algorithm are described in further detail below with reference to FIG. 10.

The matching patch system can track or monitor various parameters to utilize as a unique computation key (i.e., a key that uniquely identifies a computation) for a hash-based random search algorithm. For example, the matching patch system can track an iteration count, a pixel identifier associated with a given pixel group, or some other parameter(s). As used herein, the term "iteration count" refers to a count or number of iterations (e.g., a number of expectation maximization ("EM") iterations, a number of propagation iterations, or a number of search iterations that the matching patch system has performed with respect to a given pixel group). In addition, the term "pixel identifier" can refer to a unique characteristic of a pixel group. For example, a pixel identifier can refer to a coordinate location of a pixel group within a target region or a digital image. A pixel identifier can also (or alternatively) refer to a pixel group number (e.g., in an embodiment where each pixel group of a target region is uniquely numbered) or a pixel tag.

Additional detail regarding the matching patch system will now be provided with reference to the figures. For example, FIG. 1 illustrates a schematic diagram of an example environment for implementing a matching patch system 102 in accordance with one or more embodiments. An overview of the matching patch system 102 is described in relation to FIG. 1. Thereafter, a more detailed description of the components and processes of the matching patch system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 14.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 14. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to edit a digital image and can provide the user input to the server(s) 104. Thus, the matching patch system 102 on the server(s) 104 can receive information to use in generating deterministic enhanced digital images in accordance with user input to edit an original digital image and based on a parallel wave analysis.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including one or more digital images and/or user interface elements (e.g., editing tools) to edit or modify the digital image(s). A user can interact with the client application 110 to provide user input to, for example, select a target region of a digital image.

As illustrated in FIG. 1, the environment includes the server(s) 104. The server(s) 104 may generate, track, store, process, receive, and transmit electronic data, such as digital images as well as various parameters specific to individual pixel groups. For example, the server(s) 104 may receive data from the client device 108 in the form of a request to edit a digital image by replacing an identified target region. In addition, the server(s) 104 can transmit data to the client device 108 to provide a deterministic enhanced digital image. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the matching patch system 102 as part of a digital content management system 106. The digital content management system 106 can communicate with the client device 108 to generate, modify, and transmit digital content, such as deterministic enhanced digital images as well as various digital image editing tools.

Although FIG. 1 depicts the matching patch system 102 located on the server(s) 104, in some embodiments, the matching patch system 102 may be implemented by (e.g., located entirely or in part) on one or more other components of the environment. For example, the matching patch system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the matching patch system 102, bypassing the network 112. Additionally, the matching patch system 102 can include one or more databases (e.g., a digital image database and/or a pixel group database) housed on the server(s) 104 or elsewhere in the environment.

Figure 2:
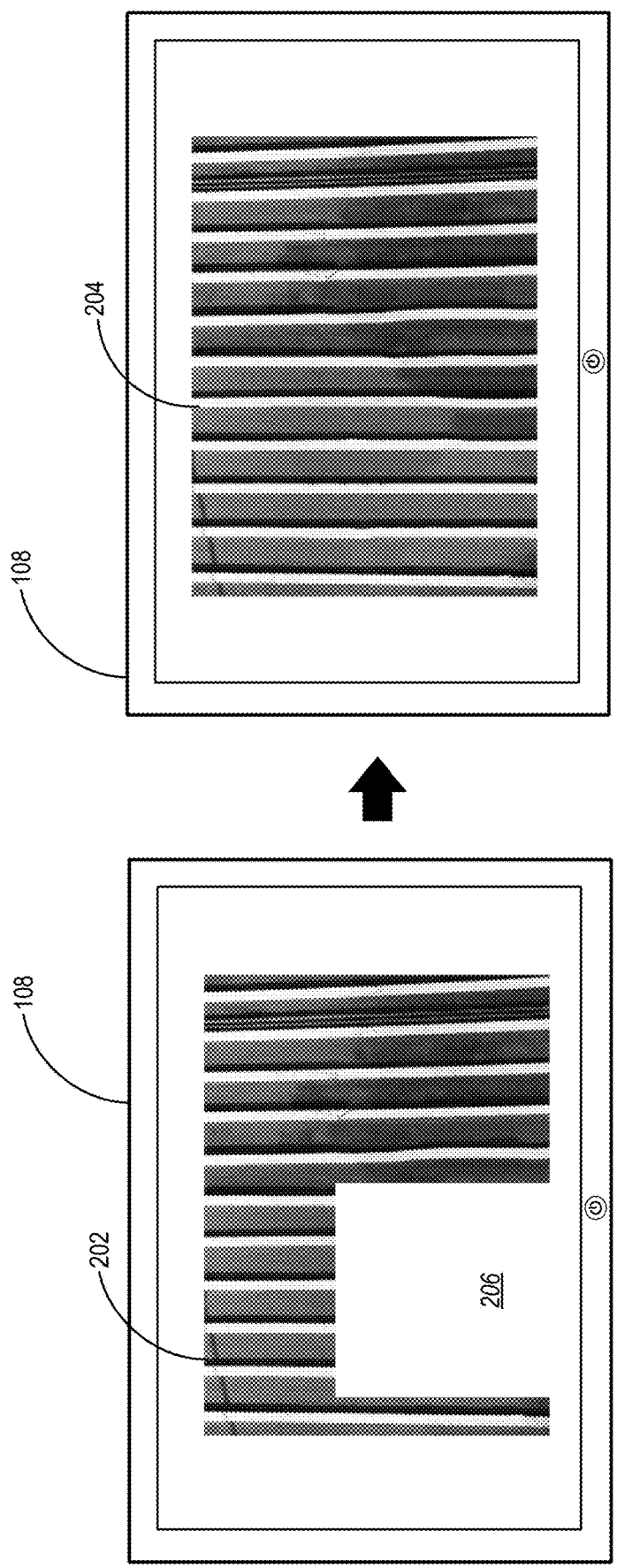
FIG. 2 illustrates an example of generating a deterministic enhanced digital image from an original digital image in accordance with one or more embodiments.

As mentioned above, the matching patch system 102 can generate a deterministic enhanced digital image by filling or replacing a target region within an original digital image. For example, FIG. 2 illustrates a client device 108 displaying an original digital image 202 including a target region 206. Based on analyzing the digital image 202 (and/or additional digital images), the matching patch system 102 generates the deterministic enhanced digital image 204 by filling or replacing the target region 206. Indeed, as shown in FIG. 2, the matching patch system 102 fills the target region 206 so that the deterministic enhanced digital image 204 appears, as displayed by the client device 108, to seamlessly blend from the pixels of the original digital image 202 to the pixels generated to fill the target region 206.

Although FIG. 2 illustrates the target region 206 as a blank area or portion of the original digital image 202, in some embodiments the target region 206 is a section, area, or portion of the digital image 202 that is pixelated, blurry, discolored, or has some other defect or visual imperfection. In these or other embodiments, the target region 206 is an area of the digital image 202 that a user selects via a user interaction with the client application 110. For example, a user can select, highlight, or outline a particular depicted object to remove from a digital image. Additionally (or alternatively), the digital image 202 can include multiple target regions in different locations within the digital image 202.

In some embodiments the matching patch system 102 analyzes multiple images to fill or replace the target region 206. To elaborate, as shown in FIG. 2 (and the subsequent figures), the matching patch system 102 fills the target region 206 based on identifying matching pixel groups from other locations within the digital image 202. In some embodiments, however, the matching patch system 102 accesses a database of digital images to analyze multiple digital images to identify matching pixel groups from more than one digital image to fill the target region 206.

To generate the deterministic enhanced digital image 204 from the original digital image 202, the matching patch system 102 propagates through pixel groups within the target region 206 to determine offsets for the pixel groups. In particular, the matching patch system 102 aggregates pixels into pixel groups and analyzes the contents of each pixel group serially. Additionally, the matching patch system 102 determines or selects a size for the pixel groups within the target region 206. Indeed, depending on the type of search method implemented, the matching patch system 102 selects a different pixel group size. For instance, when performing a translation search method, the matching patch system 102 selects a pixel block size of two-by-two pixels for improved accuracy and performance. For other search methods, the matching patch system 102 selects different sizes—e.g., the matching patch system 102 selects a size of one-by-one pixel groups when performing a similarity transform search method. In some embodiments, the pixel groups have the same dependency patterns as individual pixels, but at a block scale. Additionally, the matching patch system 102 can amortize scheduling overheads over the pixel groups for improved processing performance.

FIGS. 3A-3C respectively illustrate three different operations—initialization, propagation, and search—that the matching patch system 102 performs with respect to individual pixel groups within a target region 300 of a digital image 301. The digital image 301 and the target region 300 of FIGS. 3A-3C are not drawn to scale but are rather illustrated as similar in size for the sake of visual clarity and discussion. For similar reasons, even though the target region 300 may or may not be located within the digital image 301, FIGS. 3A-3C illustrate the target region 300 separate from the digital image 301 for discussion purposes. As shown, the matching patch system 102 divides a target region (e.g., the target region 206) into a number of evenly-sized pixel groups to analyze and propagate through to identify matching pixel groups to replace the pixel groups of the target region. As further shown, the matching patch system 102 performs the initialization, propagation, and search operations of FIGS. 3A-3C.

In some embodiments, though not illustrated in FIGS. 3A-3C, the matching patch system 102 further performs an initial or preliminary fill operation before the initialization operation of FIG. 3A. More specifically, the matching patch system 102 utilizes a fill technique to fill the pixels of the target region to at least roughly resemble other portions of the digital image (e.g., the digital image 202).

To elaborate, the matching patch system 102 performs an initial fill of a target region based on pixel values of pixels or pixel groups within different areas (e.g., bordering the target region) of the digital image. For example, the matching patch system 102 utilizes a Region of Interest ("ROI") fill operation to preliminarily fill the target region 206 of FIG. 2. In particular, the matching patch system 102 ROI fills by identifying pixel values associated with pixel groups bordering the target region 206 and replacing the blank pixel groups with the bordering pixel groups by assigning the same or similar pixel values. Indeed, ROI fill can involve smoothly interpolating inward from pixel values on the boundary of the target region 206 utilizing (e.g., by solving) a Laplace equation. In some embodiments, the matching patch system 102 utilizes a different preliminary fill technique or formula such as Region Fill.

As mentioned, the matching patch system 102 further performs an initialization operation to determine initial offsets associated with pixel groups of the target region 206. FIG. 3A illustrates an example initialization operation with respect to three different pixel groups—pixel group 302, pixel group 304, and pixel group 306. A general overview of initialization is provided in relation to FIG. 3A, while a more detailed description of the initialization operation is provided thereafter in relation to FIG. 4.

As shown in FIG. 3A, the matching patch system 102 performs an initialization operation by determining initial offsets for pixel groups within a target region 300 (e.g., the target region 206). In particular, the matching patch system 102 randomly determines initial offsets from locations within a digital image 301 (e.g., the digital image 202 or a different digital image) for each of the pixel groups 302, 304, and 306. For example, the matching patch system 102 identifies an initial offset 308 that corresponds to the pixel group 302. Similarly, the matching patch system 102 identifies an initial offset 310 that corresponds to the pixel group 306. Further, the matching patch system 102 identifies an initial offset 312 that corresponds to the pixel group 304.

To determine the initial offsets 308, 312, and 310 based on the pixel groups 302, 304, and 306, respectively, the matching patch system 102 randomly selects offsets from within the digital image 301. Indeed, the matching patch system 102 randomly selects offsets for each of the pixel groups within the target region 300 as part of the initialization operation. In some embodiments, the matching patch system 102 utilizes a hash-based random initialization algorithm to determine the initial offsets. By utilizing a hash-based random initialization algorithm, the matching patch system 102 generates initial offsets that are random but also deterministic.

As mentioned above, the matching patch system 102 further performs a propagation operation. Indeed, FIG. 3B illustrates determining propagation offsets for pixel groups of the target region 300. A general overview of propagation is provided in relation to FIG. 3B, while a more detailed description of the propagation operation is provided thereafter in relation to FIGS. 5-8.

As illustrated in FIG. 3B, the matching patch system 102 determines propagation offsets within the digital image 301 for each of the pixel groups 302, 304, and 306. Indeed, the matching patch system 102 identifies a propagation offset 314 corresponding to the pixel group 302. Similarly, the matching patch system 102 identifies a propagation offset 316 corresponding to the pixel group 304. Further, the matching patch system 102 identifies a propagation offset 318 corresponding to the pixel group 306. Additionally, although not illustrated in FIG. 3B, the matching patch system 102 determines propagation offsets for each of the other pixel groups within the target region 300. Further, although FIG. 3B illustrates determining a single propagation offset for each pixel group within the target region 300, in some embodiments the matching patch system 102 determines multiple (e.g., two) propagation offsets for each of the pixel groups (e.g., the pixel groups 302, 304, and 306).

To determine the propagation offsets 314, 316, and 318, the matching patch system 102 identifies offsets associated with different pixel groups within the target region 300. To elaborate, in relation to the pixel group 302, the matching patch system 102 looks to a neighboring (e.g., adjacent) pixel group within the target region 300 and identifies an offset (e.g., an initial offset) associated with the neighboring pixel group. The matching patch system 102 designates or assigns the offset of the neighboring pixel group as a propagation offset associated with the pixel group 302. Likewise, for the pixel groups 304 and 306, the matching patch system 102 performs similar operations to determine propagation offsets associated with neighboring pixel groups. For example, the matching patch system 102 determines the propagation offset 316 for the pixel group 306 and likewise determines the propagation offset 318 for the pixel group 304. As mentioned above, and as described in further detail below, the matching patch system 102 can determine propagation offsets simultaneously for more than one pixel group (e.g., pixel groups in a pixel wave) in parallel.

As further mentioned, the matching patch system 102 additionally performs a search (e.g., a random search) operation. FIG. 3C illustrates a random search within the digital image 301 in relation to the pixel group 306. A general overview of searching is provided in relation to FIG. 3C, while a more detailed description of the search operation is provided thereafter in relation to FIGS. 9-10.

As illustrated in FIG. 3C, in conjunction with performing the propagation operation of FIG. 3B, the matching patch system 102 further performs a search operation to identify search offsets in relation to individual pixel groups. For instance, the matching patch system 102 determines search offsets for the pixel groups 302, 304, and 306 in parallel upon identifying the propagation offsets for each of the pixel groups 302, 304, and 306, respectively. As shown in FIG. 3C, for example, the matching patch system 102 identifies a search offset 320 in relation to the pixel group 306. To identify the search offset 320, the matching patch system 102 identifies a search area 322 and performs a random search within the search area 322.

To identify the search area 322, the matching patch system 102 centers a rectangular (e.g., a concentric square) area within the digital image 301 around a current selected offset. To determine the current selected offset, the matching patch system 102 compares initial offsets with propagation offsets. In relation to the pixel group 302, for example, the matching patch system 102 compares the initial offset 308 with the propagation offset 314. In particular, the matching patch system 102 compares the initial offset 308 with the propagation offset 314 by determining which offset is closer to the pixel group 302. For example, the matching patch system 102 determines a minimum between an initial NNF and a propagation NNF to select, as a current offset for the pixel group 302, the NNF that is the closer match. The matching patch system 102 further determines current selected offsets by comparing initial offsets and propagation offsets for pixel groups 304 and 306 in like fashion. Thus, the matching patch system 102 determines a currently selected offset around which to center the search area 322.

In some embodiments, the search area 322 is a different shape such as a circle or triangle. For example, as shown in FIG. 3C, the matching patch system 102 determines that the propagation offset 316 is a closer match than the initial offset 310. Thus, the matching patch system 102 centers the search area 322 around the propagation offset 316 and randomly samples offsets within the search area 322 to identify the search offset 320. In some embodiments, the matching patch system 102 performs the random search multiple times with different search radii for each expectation maximization iteration. For example, in relation to FIG. 3C, the matching patch system starts with a radius that covers the entire digital image 301 and reduces the radius by half on each iteration (as indicated by the different dashed boxes centered around the search offset 320 in FIG. 3C) until the search area 322 is the same size as the pixel group 306.

To sample offsets within the search area 322, the matching patch system 102 utilizes a hash-based random search algorithm. In relation to the pixel group 306, for example, the matching patch system 102 samples offsets within the search area 322 in a random but deterministic fashion. Indeed, because the matching patch system 102 utilizes a random search algorithm that is hash-based, the searching within a search area to identify search offsets is deterministic. Additional detail regarding the hash-based random search algorithm is provided below with reference to FIG. 10.

To determine a matching patch offset for a given pixel group, the matching patch system 102 further compares identified search offsets with initial offsets and/or propagation offsets. Taking the example of FIG. 3C, for instance, the matching patch system 102 compares the search offset 320 corresponding to the pixel group 306 with the propagation offset 316 and the initial offset 310. In particular, the matching patch system 102 determines which offset is a closest match to the pixel group 306. In some embodiments, however, the matching patch system 102 compares the search offset 320 with a currently selected offset. For instance, in relation to the pixel group 306, the matching patch system 102 compares the search offset 320 with a selected offset from among the initial offset 310 and the propagation offset 316, whichever is a closer match to the pixel group 306.

For example, the matching patch system 102 can determine matching patch offsets based on determining and comparing initialization offsets, propagation offsets, and search offsets by implementing a process similar to the following pseudo-code: For all scale, s, do {
For all EM iteration, emi do {
1. Initialize Random Field
2. Search (a. Propagation followed by b. Random search)
If an NNF from previous iterations
  3. NNF=Min (NNF, Previous NNF) Search (Sequential followed by Random)
}
4. Vote
}
5. Upscale the current solution for the next scale
}

To provide additional detail, the matching patch system 102 can utilize the following pseudocode in performing matching patch iterations:
for all matching patch iterations, I, do
{
  for all x, y in NNF field of target region, do
  {
    dstXY=x, y; →coordinate location within target region
    curBest=NNF(dstXY);
    propagate(curBest, (x−1, y));
    propagate(curBest, (x, y−1));
    curBest=randomSearch(curBest); →do the neighbors have a better match?
    NNF(dstXY)=curBest; →use best match
  }
}

As mentioned, the matching patch system 102 can perform an initialization operation, a propagation operation, and/or a search operation for a pixel group in parallel with other pixel groups within a pixel wave of a digital image. FIGS. 4-9 describe performing an initialization operation, a propagation operation, and a search operation in accordance with one or more embodiments. For ease of illustration, FIGS. 4, 5, and 9 describe these operations with regard to individual pixels (or pixel groups) within a target image. It will be appreciated, that the matching patch system 102 can perform these operations for each pixel group in parallel with other pixel groups in a pixel wave.

Figure 4:
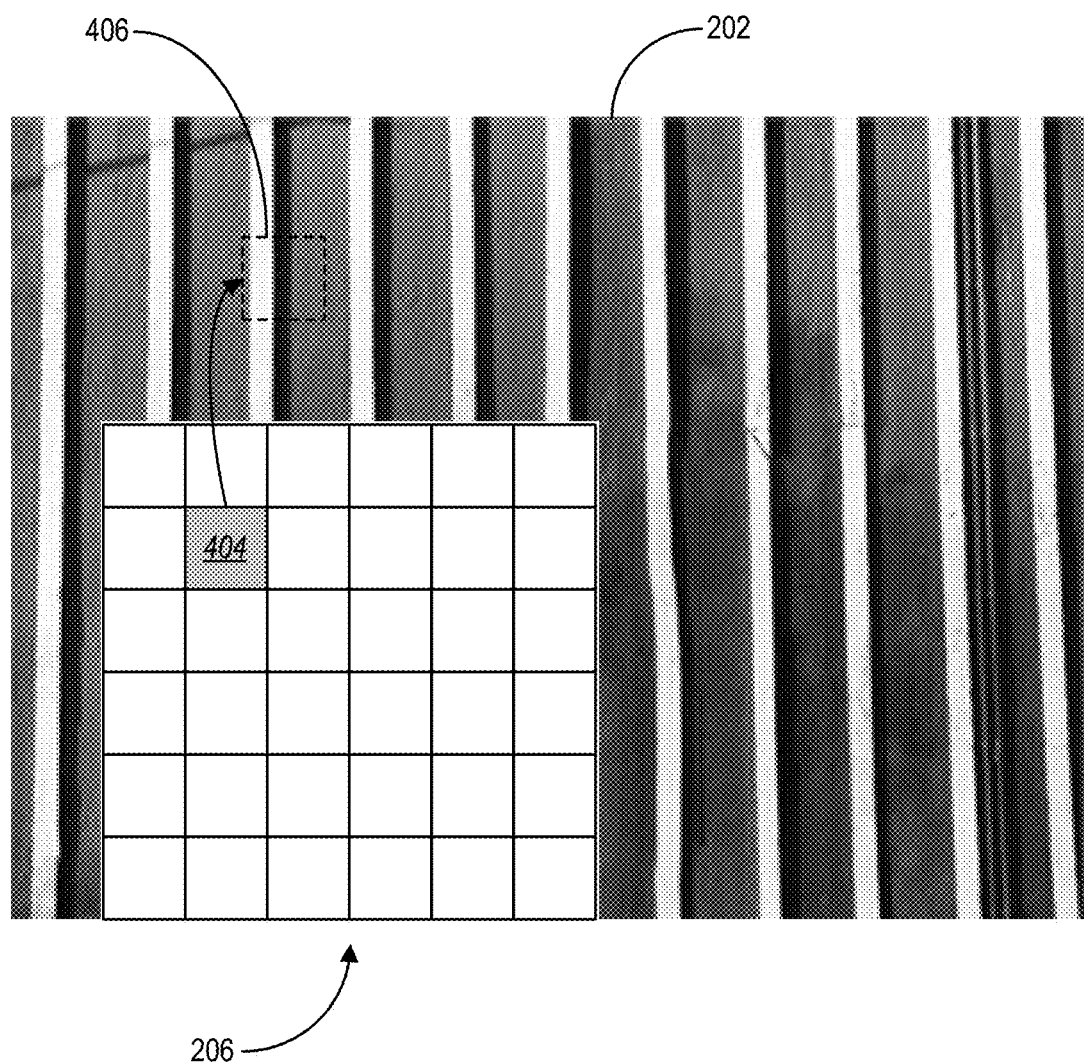
FIG. 4 illustrates an initialization operation in accordance with one or more embodiments.

Indeed, FIG. 4 illustrates how the matching patch system 102 applies an initialization operation to the digital image 202. As shown, the matching patch system 102 determines an initial offset 406 for the pixel group 404. While FIG. 4

(and FIGS. 5 and 9) illustrate performing operations in relation to a particular pixel groups (e.g., the pixel group 404), the matching patch system 102 performs similar operations in relation to other pixel groups within the target region 206. In particular, the matching patch system 102 can perform an initialization operation for a pixel group in parallel with other pixel groups in a pixel wave of the target region 206.

As discussed above, in some embodiments the matching patch system 102 segments or divides the target region 206 into pixel groups as shown by the grid in FIG. 4. Upon generating the pixel groups (and pixel waves), the matching patch system 102 performs an initialization operation to determine initial offsets for each of the pixel groups. To determine the initial offsets, the matching patch system 102 randomly samples offsets within the digital image 202 for each of the respective pixel groups within the target region 206. For example, the matching patch system 102 determines an initial offset 406 for the pixel group 404 by randomly sampling from the digital image 202 in relation to the pixel group 404. As mentioned above, in some embodiments the matching patch system 102 utilizes a hash-based random initialization algorithm to sample offsets in a random, but deterministic fashion.

Figure 5:
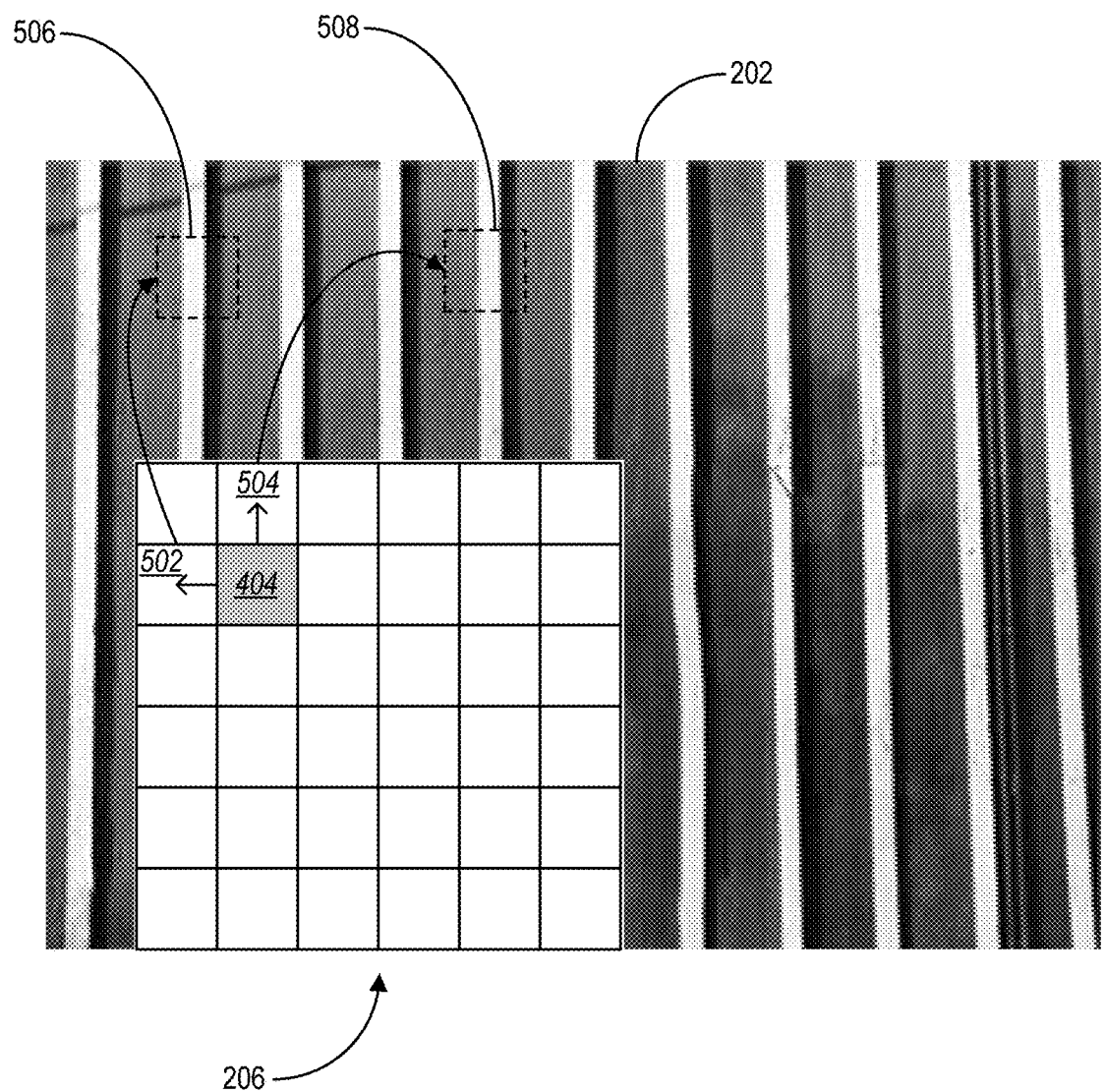
FIG. 5 illustrates a propagation operation in accordance with one or more embodiments.

Upon performing an initialization operation to determine initial offsets for the pixel groups (e.g., the pixel group 404), the matching patch system 102 further performs a propagation operation. Indeed, FIG. 5 illustrates determining propagation offsets for the pixel groups within the target region 206 (e.g., for a pixel group within a pixel wave of the target region 206). For example, the matching patch system 102 determines propagation offsets 506 and 508 for the pixel group 404.

To determine the propagation offsets 506 and 508, the matching patch system 102 identifies offsets associated with pixel groups 502 and 504, respectively. To elaborate, the matching patch system 102 identifies offsets (e.g., initial offsets, propagation offsets, or search offsets) associated with pixel groups 502 and 504 that neighbor the pixel group 404. For example, the matching patch system 102 looks to pixel groups that neighbor the pixel group 404 to the left (left pixel group 502) and above (top pixel group 504) and identifies offsets associated with each of the neighboring pixel groups 502 and 504 as propagation offsets corresponding to the pixel group 404. Indeed, the propagation offset 506 can represent an initial offset, a propagation offset, a search offset, or a selected offset associated with the pixel group 502, and the propagation offset 508 can also represent an initial offset, a propagation offset, a search offset, or a selected offset associated with the pixel group 504. In some embodiments, though not illustrated in FIG. 5, the matching patch system 102 determines propagation offsets by looking to a pixel group to the right of a given a pixel group and to a pixel group below (or under or beneath) the given pixel group.

Figure 6:
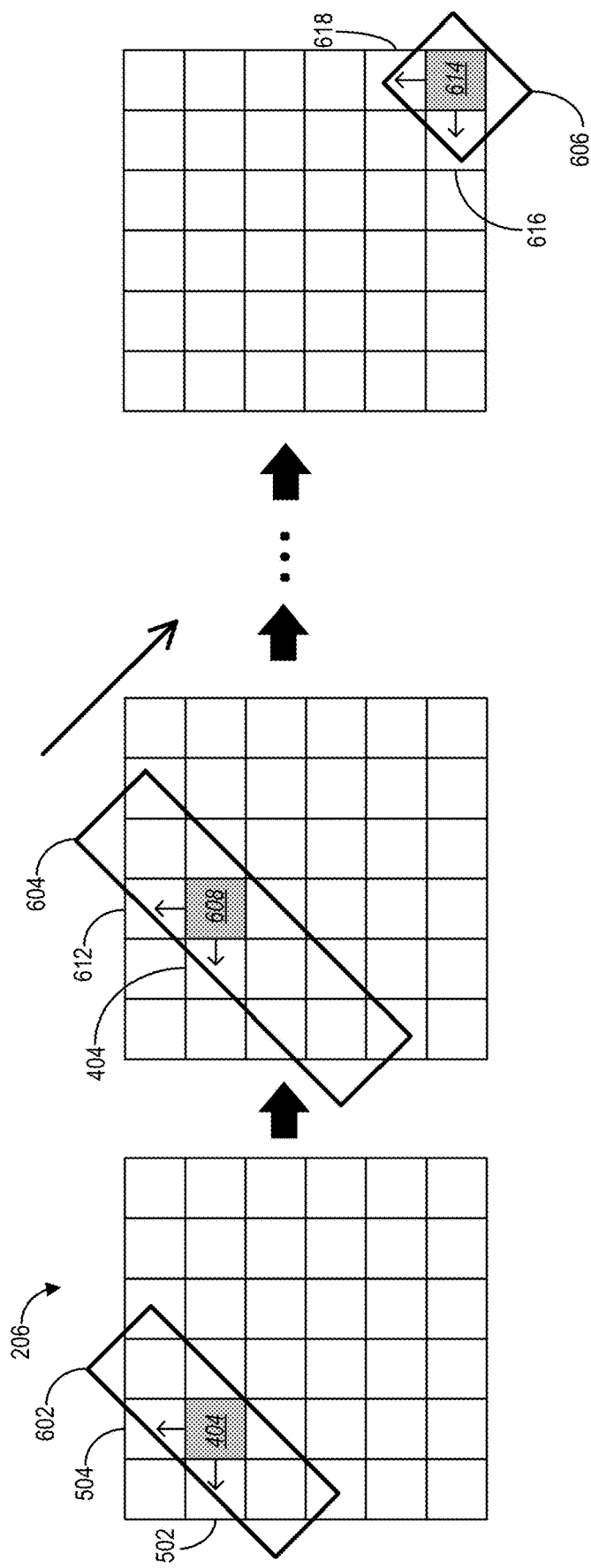
FIG. 6 illustrates a propagation operation through multiple pixel waves of a target region in accordance with one or more embodiments.

As mentioned above, the matching patch system 102 propagates through the pixel groups of the target region 206 by analyzing pixel groups in pixel waves. Thus, in addition to performing initialization operations in parallel for pixel groups in a pixel wave, the matching patch system 102 can determines propagation offsets for pixel groups within a given pixel wave in parallel. FIG. 6 illustrates an example process of propagating through pixel waves of pixel groups. As shown in FIG. 6, the matching patch system 102 analyzes pixel waves that include pixel groups arranged diagonally— i.e., that are diagonally adjacent to one another. In addition, the matching patch system 102 propagates through pixel groups by sequentially analyzing pixel waves diagonally down and right through the target region 206.

As illustrated in FIG. 6, the matching patch system 102 identifies a pixel wave 602 that includes three pixel groups such as the pixel group 404. In relation to the pixel group 404, the matching patch system 102 determines one or more propagation offsets (e.g., the propagation offsets 506 and 508). For example, the matching patch system 102 determines a first offset that corresponds to the left pixel group 502 that neighbors the pixel group 404 on the left. The matching patch system 102 also determines a second offset that corresponds to the top pixel group 504 that neighbors the pixel group 404 from above. The offsets of the pixel groups 502 and 504 can refer to initial offsets, propagation offsets, search offsets, or selected offsets that the matching patch system 102 determines based on a previous comparison of initial offsets with propagation offsets (e.g., a pixel group from a previously-propagated pixel wave).

In a similar fashion, the matching patch system 102 determines propagation offsets for the other pixel groups within the pixel wave 602 as well. Indeed, the matching patch system 102 determines the propagation offsets for two or more of the pixel groups within the pixel wave 602 in parallel. The matching patch system 102 can determine the propagation offsets in parallel because none of the offsets of the pixel groups within the pixel wave 602 depend on an analysis of other pixel groups within the same pixel wave 602. More specifically, the matching patch system 102 bases the determination of propagation offsets for the pixel wave 602 on pixel groups that have been previously propagated. Indeed, the pixel groups 502 and 504 each belong to a pixel wave that is up and to the left of the pixel wave 602, which means that the matching patch system 102 has already determined selected offsets for the pixel groups 502 and 504 by the time the matching patch system 102 analyzes the pixel wave 602.

Based on determining the propagation offsets 506 and 508 for the pixel group 404, the matching patch system 102 further compares the propagation offsets 506 and 508 with the initial offset 406 associated with the pixel group 404. As described above, the matching patch system 102 determines which offset is closest to the pixel group 404 (i.e., closer in visual appearance) and selects the closest offset for the pixel group 404. Similarly, the matching patch system 102 compares and selects offsets for each of the other pixel groups within the pixel wave 602 in parallel.

As further illustrated in FIG. 6, (upon determining selected matching patch offsets in the pixel wave 602) the matching patch system 102 analyzes additional pixel waves within the target region 206. For instance, the matching patch system 102 determines propagation offsets for pixel groups within the pixel wave 604. As shown, the pixel wave 604 is the next pixel wave after the pixel wave 602 along the progression of the down-and-right propagation through the pixel groups of the target region 206.

Similar to the propagation operation in relation to the pixel wave 602, the matching patch system 102 parallelly determines propagation offsets for the pixel groups within the pixel wave 604. For example, the matching patch system 102 determines propagation offsets associated with the pixel group 608. More specifically, the matching patch system 102 looks to the pixel group 404 to the left of the pixel group 608 and identifies an offset associated with the pixel group 404 as a propagation offset for the pixel group 608. As described above, the matching patch system 102 analyzes the pixel group 404 (a left pixel group in relation to pixel group 608), compares propagation offsets 506 and 508 with the initial offset 406 (and/or one or more search offsets described below), and further selects a closest offset for the pixel group 404 based on the comparison. Thus, in determining propagation offsets for the pixel group 608, the matching patch system 102 identifies the selected offset of the pixel group 404 as a propagation offset for the pixel group 608.

The matching patch system 102 also looks to the top pixel group 612 located above the pixel group 608 and identifies an offset associated with the pixel group 612. For example, the matching patch system 102 identifies a selected offset from among an initial offset, one or more propagation offsets, and/or one or more search offsets associated with the pixel group 612, and the matching patch system 102 assigns the selected offset as a propagation offset for the pixel group 608. The matching patch system 102 performs similar operations to determine propagation offsets for each of the other pixel groups within the pixel wave 604 in parallel with the determination of the propagation offsets for pixel group 608. Based on looking to pixel groups that are up and to the left of pixel groups within the current pixel wave 604, the matching patch system 102 determines propagation offsets from previously propagated pixel groups.

As illustrated in FIG. 6, the matching patch system 102 continues to propagate through diagonal pixel waves of the target region 206 to determine propagation offsets for each of the pixel groups. Indeed, similar to the above description regarding the pixel groups 404 and 608, the matching patch system 102 determines propagation offsets for the pixel group 614 within the pixel wave 606. As shown, the pixel group 614 is the only pixel group within the pixel wave 606. In addition, the matching patch system 102 determines propagation offsets by looking to offsets associated with the neighboring pixel groups 616 and 618, which the matching patch system 102 previously propagated as part of a prior pixel wave.

As mentioned above, in some embodiments the matching patch system 102 propagates through pixel groups of a target region (e.g., the target region 206) by performing a top-to-bottom analysis of pixel groups. In these embodiments, as described in relation to FIG. 6, the matching patch system 102 analyzes pixel groups in pixel waves starting at the top-left and propagating through pixel waves in a movement (e.g., a wave) down and to the right. In other embodiments, however, the matching patch system 102 propagates through pixel waves and pixel groups in a bottom-to-top pass, starting at the bottom-right, where the matching patch system 102 moves up and to the left through the various pixel waves.

In these embodiments, the matching patch system 102 begins the propagation with a bottom right pixel group (e.g., pixel group 614) and propagates up and to the right. For example, the matching patch system 102 determines offsets for pixel groups 616 and 618 within a pixel wave. Because the propagation direction is reversed from the above discussion, the matching patch system 102 looks to adjacent pixel groups on the reverse side of those described in the top-to-bottom propagation. For example, the matching patch system 102 looks to right pixel groups instead of left pixel groups, and looks to bottom pixel groups instead of top pixel groups. Indeed, FIG. 7 illustrates an example top-to-bottom pass 702 as well as an example bottom-to-top pass 704, including the data dependencies associated with each pass. The dependencies illustrated in FIG. 7 form an acyclic graph used to implement the wavefront propagation analysis described herein.

As shown in FIG. 7, the matching patch system 102 implements a top-to-bottom pass 702 to propagate through pixel groups of a target region (e.g., the target region 206). As described above, to perform the top-to-bottom pass 702, the matching patch system 102 looks, for a given pixel group 706, to pixel groups above (a top pixel group) and to the left (a left pixel group). For example, to select an offset NNF[i,j] (where i and j represent coordinates within a target region or a digital image) for the pixel group 706, the matching patch system 102 identifies an offset NNF[i−1,j] associated with a pixel group to the left of the pixel group 706 and compares the offset NNF[i−1,j] with an initial offset of the pixel group 706. The matching patch system 102 further identifies an offset NNF[i,j−1] associated with a pixel group above the pixel group 706 and compares the offset NNF[i,j−1] with the initial offset of the pixel group 706 and the offset NNF[i−1,j] of the other neighboring pixel group. Thus, the matching patch system 102 determines a closest matching patch offset as the offset NNF[i,j] for the pixel group 706.

As further shown in FIG. 7, the matching patch system 102 implements a bottom-to-top pass 704 by looking, with respect to a given pixel group, to pixel groups to the right (a right pixel group) and down from the given pixel group (a bottom pixel group). Indeed, the bottom-to-top pass 704 illustrates that, for a given pixel group 708, the matching patch system 102 determines an offset NNF[i,j] based on an offset NNF[i+1,j] associated with a pixel group to the right of the pixel group 708 and an offset NNF[i,j+1] associated with a pixel group below the pixel group 708. To illustrate, the matching patch system 102 determines an offset NNF [i+1,j] associated with the pixel group to the right of the pixel group 708 and compares the offset NNF[i+1,j] with the initial offset of the pixel group 708. In addition, the matching patch system 102 determines an offset NNF[i,j+1] associated with the pixel group below the pixel group 708 and compares the offset NNF[i,j+1] with the offset NNF[i+1,j] and the initial offset of the pixel group 708. Thus, the matching patch system 102 determines a closest matching patch offset as the offset NNF[i,j] for the pixel group 708. For particular offsets, such as similarity transforms, the matching patch system 102 schedules each NNF[i,j] separately, which can result in an overall 25% increase in speed.

FIG. 7 illustrates two different embodiments of the matching patch system 102—one for the top-to-bottom pass 702, and another for the bottom-to-top pass 704. In other embodiments, though not illustrated in FIG. 7, the matching patch system 102 analyzes pixel waves starting from the top-right, where the matching patch system 102 moves down and to the left through pixel waves that are mirrored versions of those illustrated in FIG. 6. In these embodiments, to determine propagation offsets for a given pixel groups, the matching patch system 102 looks to pixel groups that are up and to the right. In still other embodiments, the matching patch system 102 analyzes pixel waves starting from the bottom-left, where the matching patch system 102 moves up and to the right through pixel waves. In these embodiments, to determine propagation offsets for a given pixel group, the matching patch system 102 looks to pixel groups that are down and to the left.

Figure 8:
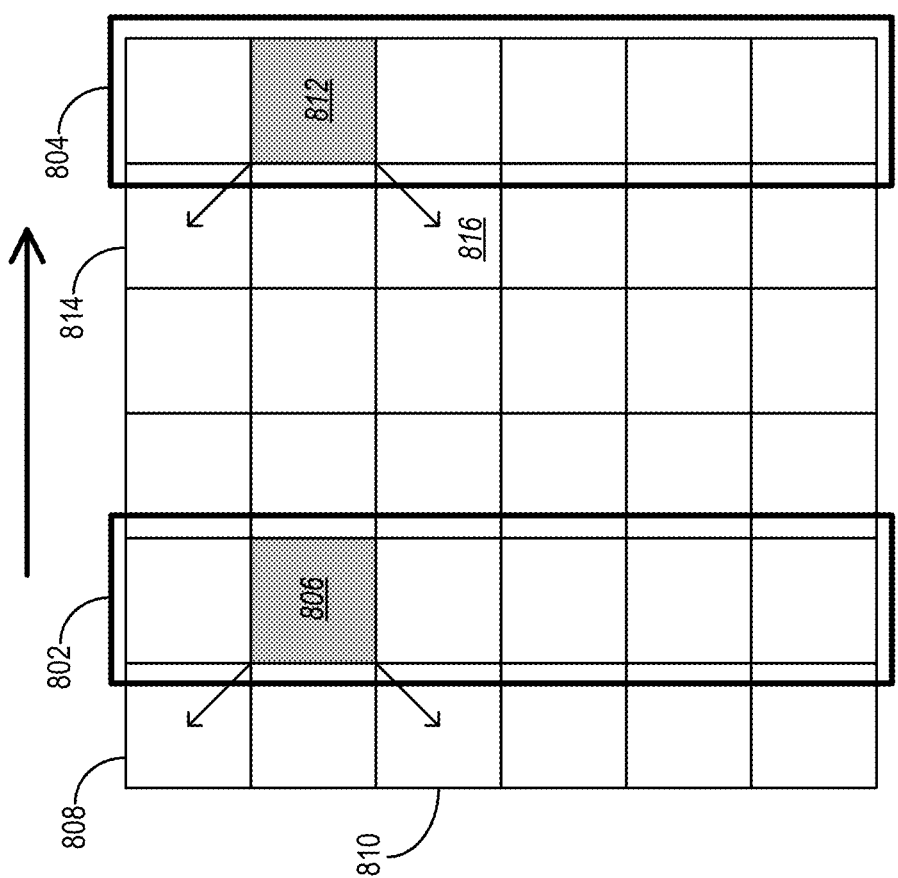
FIG. 8 illustrates application of a propagation operation through multiple pixel waves of a target region in accordance with one or more embodiments.

Further, in some embodiments, the matching patch system 102 implements a propagation operation by utilizing pixel waves that are not diagonally arranged. Indeed, FIG. 8 illustrates an alternative arrangement of pixel waves that the matching patch system 102 can utilize to propagate through pixel groups in determining propagation offsets. As illustrated in FIG. 8, the matching patch system 102 propagates through vertical pixel waves that satisfy the dependency graph conditions discussed above (e.g., in relation to FIG. 7). Indeed, the vertical pixel waves of FIG. 8 are merely illustrative to show that the matching patch system 102 can utilize any waveform propagation where the data dependency between computations form an acyclic graph.

As shown in FIG. 8, the matching patch system 102 determines, in parallel, propagation offsets for pixel groups (e.g., the pixel group 806) within the pixel wave 802. To determine the propagation offsets for the pixel group 806, the matching patch system 102 looks to pixel groups diagonally up and left (e.g., the pixel group 808) and diagonally down and left (e.g., the pixel group 810) from the pixel group 806. In some embodiments, the matching patch system 102 can look to other pixel groups to identify a propagation offset (e.g., pixels directly to the left).

In some embodiments, the matching patch system 102 looks to pixel groups that are not necessarily adjacent to or touching the pixel group 806. For instance, if the offset for the pixel group is given by NNF[i,j], the matching patch system 102 can identify an offset NNF[i−2,j−2] and an offset NNF[i+2j+2] as propagation offsets.

Additionally, the matching patch system 102 continues to analyze subsequent pixel waves moving in a direction to the right. Ultimately, the matching patch system 102 reaches the right boundary of a target region (e.g., the target region 206) and determines propagation offsets for the pixel groups within the pixel wave 804. For example, the matching patch system 102 determines propagation offsets for the pixel group 812 based on offsets associated with the pixel groups 814 and 816. Thus, by moving to the right through subsequent pixel waves and by identifying propagation offsets based on pixel groups to the left of each individually propagated pixel group, the matching patch system 102 determines propagation offsets based on previously propagated pixel groups. Due to the data dependency on previously propagated pixel groups, the matching patch system 102 can determine propagation offsets for pixel groups in a given pixel wave (e.g., the pixel wave 802 or the pixel wave 804) in parallel.

Figure 9:
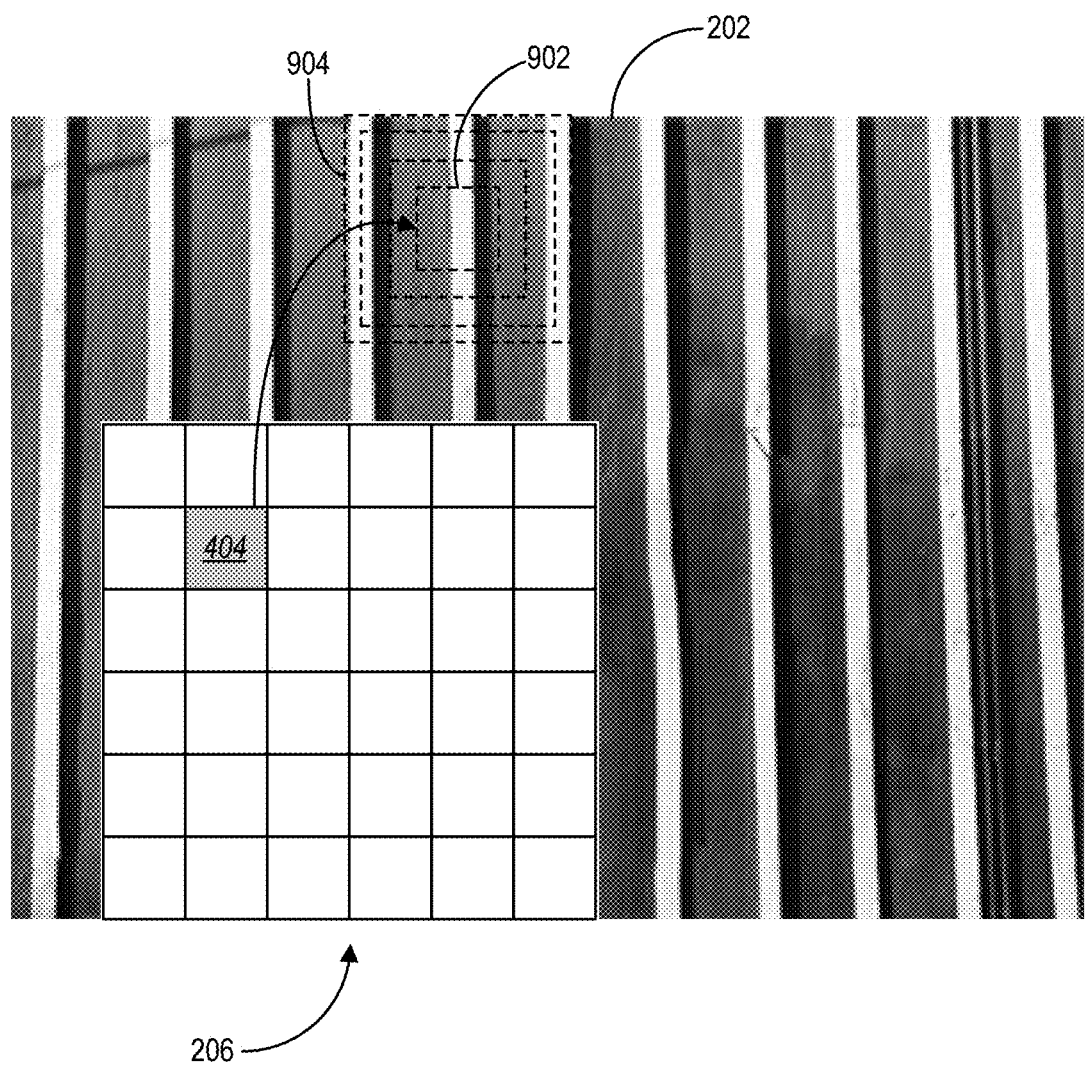
FIG. 9 illustrates a search operation in accordance with one or more embodiments.

As mentioned above, the matching patch system 102 further performs a search operation in conjunction with performing a propagation operation (e.g., in parallel for pixel groups of a pixel wave). FIG. 9 illustrates an example random search operation in relation to the pixel group 404 within the target region 206 of the digital image 202. As shown, the matching patch system 102 performs a random search operation to determine a search offset 902 for the pixel group 404. In particular, the matching patch system 102 identifies a search area 904 centered around a currently selected offset associated with the pixel group 404. For example, based on comparing the propagation offsets 506 and 508 and the initial offset 406, the matching patch system 102 determines a currently selected offset and centers the search area 904 around the currently selected offset.

As described above, the matching patch system 102 generates a search area 904 such as a concentric square and determines a search offset 902 from within the search area 904. In some embodiments, the search area 904 starts with a size equal to the area of the digital image 202 and reduces the size of the search area 904 until the size is equal to the size of the pixel group 404. To determine the search offset 902 from within the search area 904, the matching patch system 102 utilizes a hash-based random search algorithm. Based on the hash-based random search algorithm, the matching patch system 102 determines a random but deterministic location within the search area 904 from which to sample the search offset 902.

As described above in relation to FIGS. 6-8, the matching patch system 102 determines propagation offsets for multiple pixel groups of a given pixel wave in parallel. Similarly, the matching patch system 102 performs search operations for multiple pixel groups in parallel as well. For example, the matching patch system 102 parallelly performs a random search for each pixel group (or a subset of pixel groups) within a pixel wave (e.g., the pixel wave 602 or 802) to determine search offsets for each of the pixel groups within the pixel wave. Indeed, upon determining propagation offsets for pixel groups within a given pixel wave (e.g., the pixel wave 602 or 802), the matching patch system 102 determines search offsets for the pixel groups as well. By determining propagation offsets and search offsets for pixel groups in each pixel wave throughout the wavefront analysis, the matching patch system 102 creates dependencies on complete, accurate data (i.e., pixel groups) that has already been propagated.

In addition, the matching patch system 102 compares (in parallel) initial offsets, propagation offsets, and search offsets to determine matching patch offsets for pixel groups within the pixel waves. For example, in relation to pixel group 404, the matching patch system 102 compares the initial offset 406 with the propagation offsets 506 and 508 and the search offset 902. By comparing the offsets, the matching patch system 102 determines a matching patch offset as the offset from among the initial offset 406, the propagation offsets 506 and 508, and the search offset 902 that is the closest match to the pixel group 404. In line with the above description regarding propagation and searching, the matching patch system 102 compares offsets and determines matching patch offsets for each pixel group within a pixel wave (e.g., the pixel wave 602 or 802) in parallel with other pixel groups within the same pixel wave. In some embodiments, the matching patch system 102 compares search offsets with selected offsets (e.g., selected via a comparison of initial offsets and propagation offsets) for a pixel group.

Figure 10:
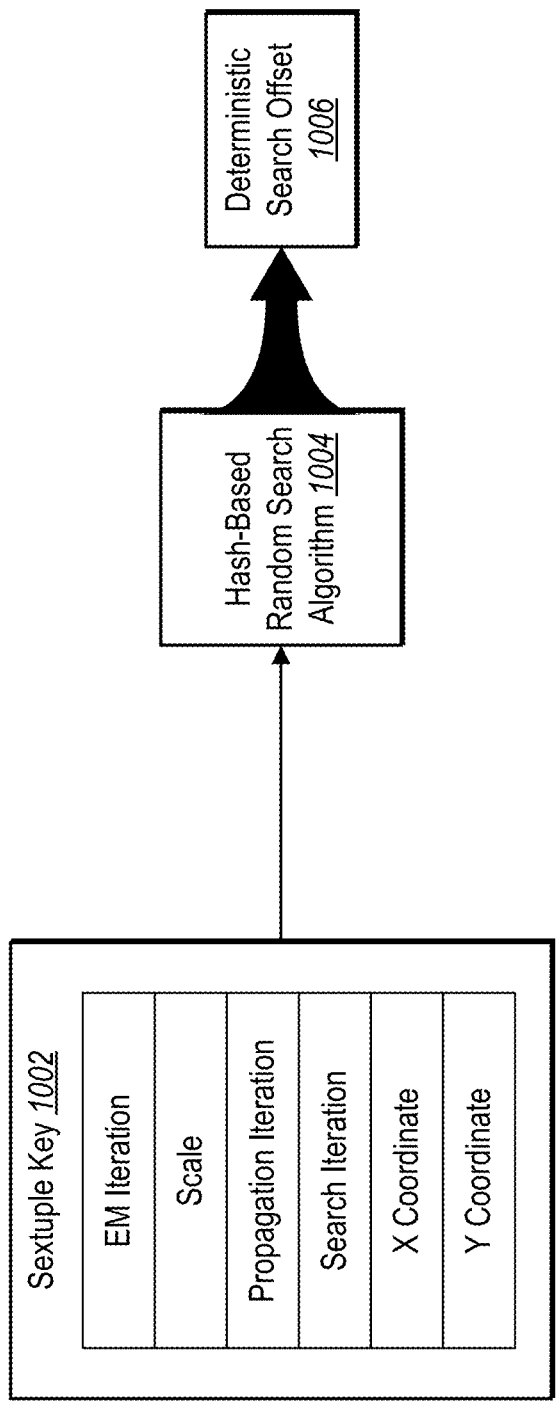
FIG. 10 illustrates application of a hash-based random search algorithm in accordance with one or more embodiments.

As mentioned, the matching patch system 102 utilizes a hash-based random search algorithm to determine search offsets. FIG. 10 illustrates an example hash-based random search algorithm 1004 that the matching patch system 102 utilizes to determine a deterministic search offset 1006 (i.e., a location from which to sample the search offset 902) within a search area (e.g., the search area 904). As shown in FIG. 10, the matching patch system 102 tracks or monitors several parameters or factors to utilize as a unique computation key. Indeed, the matching patch system 102 utilizes a unique computation key that identifies a particular computation. For example, the matching patch system 102 tracks parameters such as an iteration count and a pixel identifier. In some embodiments, the matching patch system 102 utilizes one or more atomic counters (e.g., atomic counters associated with each pixel group) which are configured to decrement to track pixel group dependencies.

For example, the matching patch system 102 utilizes a scoped dependency grid array ("SDG") to organize the atomic counters for easy lookup. Particularly, the matching patch system 102 initializes an SDG as SDG[x,y]=(x>0)+(y>0). Indeed, the matching patch system 102 initializes a first (e.g., the top-left) pixel group with an atomic counter value of 0, initializes the next pixel groups (e.g., the pixel groups 502 and 504) in the subsequent pixel wave (e.g., the pixel wave 602) with atomic counter values of 1, and initializes all other pixel groups with atomic counter values of 2. As the matching patch system 102 performs operations on a given pixel group, its atomic counter decrements from its initial value of 2 until reaching 0, indicating that the pixel group is ready for parallel processing. Likewise, the matching patch system 102 performs a similar analysis for each child pixel group following the initial given pixel group. To elaborate, in some embodiments the matching patch system 102 implements the following code as part of a wavefront propagation analysis:

```
auto RunWaveFrontLambda=[=,&sdg](const Int_Point&
    startDstXY, FeederType& feeder)
{
    Int_Point dstXY;
    Int_Point dstXYOffset;
    int blockStartY=startDstXY.y;
    int blockEndY=startDstXY.y+change*sdg.blockY( )
    int blockStartX=startDstXY.x;
    int blockEndX=startDstXY.x+change*sdg.blockX( )
    //Execute 1 block on this task
    for (int y=blockStartY; (y !=blockEndY) && (y
        !=yend); y+=change)
    {
    dstXY.y=y;
        for (int x=blockStartX; (x !=blockEndX) && (x
            !=xend); x+=change)
        {
            dstXY.x=x;
            dstXYOffset=RunSearchAtXYLambda(dstXY);
        }
    }
    dstXYOffset.x 1=sdg.blockX( )
    dstXYOffset.y 1=sdg.blockY( )
    int blockChangeX=change*sdg.blockX( )
    int blockChangeY=change*sdg.blockY( )
    //Launch dependent blocks
    if ((dstXY.x+change !=xend)//Here, we want to use the
        last point in the executed blocks may be only par-
        tially valid
        && (--sdg.atXY(dstXYOffset.x+1, dstXYOffset.y)
            ==0))
    {
        //add the element @ x+/−1 when its counter reaches
            zero (forward/backward pass)
        feeder.add(Int_Point(startDstXY.x+blockChangeX,
            startDstXY.y));
    }
    if ((dstXY.y+change !=yend)
        && (--sdg.atXY(dstXYOffset.x, dstXYOffset.y+1)
            ==0))
    {
        //add the element @ y+/−1 when its counter reaches
            zero (forward/backward pass)
        feeder.add(Int_Point(startDstXY.x,    startDstXY.y+
            blockChangeY));
    }
}
```

Note that the topLeft is marked as all its dependencies are met.

In some embodiments, the matching patch system 102 implements a unique computation key that includes six parameters—EM iteration, scale, propagation iteration, search iteration, X (or i) coordinate, and Y (or j) coordinate—and is thus referred to as a sextuple key 1002. Although illustrated as a sextuple key, the mating patch system 102 can utilize a variety of different unique computation keys of different sizes and forms. The matching patch system 102 applies the hash-based random search algorithm described herein to select search offsets for pixel groups (e.g., by selecting a search area of the digital image). In relation to FIG. 10, the matching patch system 102 tracks the EM iteration, scale, propagation iteration, search iteration, X coordinate, and Y coordinate to utilize as a unique computation key for the analysis (e.g., propagation and search) of each pixel group.

For instance, the matching patch system 102 tracks an EM iteration. In particular, the matching patch system 102 tracks which iteration of the expectation maximization algorithm the matching patch system 102 is currently performing for a given pixel group (e.g., the pixel group 404). Indeed, the matching patch system 102 can perform multiple EM iterations. For instance, the matching patch system 102 can implement an expectation ("E") step whereby the matching patch system 102 creates a function for an expectation of a log-likelihood for a current estimate for given parameters. Alternatively, the matching patch system 102 can implement a maximization ("M") step whereby the matching patch system 102 determines parameters to maximize the expected log-likelihood determined via the expectation step. The matching patch system 102 then utilizes the determined parameters for determining a distribution of latent variables for the next expectation step. For each EM iteration, the matching patch system 102 performs an initialization operation, a propagation operation, and a search operation, and a selection of matching patch offsets (based on comparing offsets), as described above.

In addition, the matching patch system 102 tracks a scale associated with an analysis of a pixel group (e.g., the pixel group 404). In particular, the matching patch system 102 utilizes a resizing process (e.g., a gradual coarse-to-fine scaling or resizing) to gradually scale a digital image (e.g., the digital image 202 or the digital image 204) or a region of a digital image by a small factor for each iteration of the matching patch analysis of a digital image (e.g., the digital image 202). For example, the matching patch system 102 performs an initialization, propagation, and search to match a target region (e.g., the target region 206) at a first scale and subsequently upscales or upsamples to a finer scale to perform an initialization, propagation, and search at the finer scale as well. The matching patch system 102 modifies the upsampling of an offset field (e.g., an NNF field) to always use the displacement of the closest valid upsampled offset coordinate. In some embodiments, the matching patch system 102 performs multiple EM iterations for each particular scale of the rescaling process. Upon completing the EM iterations (which each include initialization, propagation, search, and selection of matching patch offsets) for a given scale, the matching patch system 102 upscales to a new scale and repeats the EM iterations at the new scale.

The matching patch system 102 further tracks a propagation iteration and a search iteration associated with a pixel group (e.g., the pixel group 404). In particular, the matching patch system 102 determines a propagation iteration by tracking a number of times the matching patch system 102 the matching patch system 102 determines a propagation offset (e.g., propagation offset 506 or 508) for a given pixel group (e.g., the pixel group 404). Further, the matching patch system 102 determines a search iteration by tracking a number of times the matching patch system 102 samples offsets from within a search area (e.g., the search area 904) for a given pixel group (e.g., the pixel group 404).

Further, the matching patch system 102 tracks a horizontal X coordinate (or i coordinate) and a vertical Y coordinate (or j coordinate) associated with a pixel group (e.g., the pixel group 404). In particular, the matching patch system 102 determines a coordinate location of a given pixel (e.g., a top-left corner pixel, a bottom-right corner pixel, or a center pixel) within the pixel group 404. Likewise, the matching patch system 102 determines the coordinate location for each other pixel group upon analyzing the pixel groups.

As illustrated in FIG. 10, the matching patch system 102 utilizes the sextuple key 1002 as input for the hash-based random search algorithm 1004. Based on the sextuple key 1002, the matching patch system 102 utilizes the hash-based random search algorithm 1004 to generate or determine a particular deterministic search offset 1006 from which to sample a search offset (e.g., the search offset 902). The hash-based random search algorithm 1004 generates a search location that is random but also deterministic. Indeed, because the matching patch system 102 knows the search key (i.e., sextuple key 1002) and the hash function associated with the hash-based random search algorithm 1004, the deterministic search offset 1006 is random but repeatable given the same sextuple key 1002.

While FIGS. 4-10 illustrate example cases of implementing an initialization operation, a propagation operation, and a search operation in relation to particular pixel groups (e.g., the pixel group 404), the matching patch system 102 further performs propagation operations in relation to each of the remaining pixel groups within the target region 206 as well. For example, the matching patch system 102 performs an initialization operation, a propagation operation, and a search operation in relation to the pixel groups 502 and 504. However, as shown, pixel groups 502 and 504 are on the border of the target region 206, which means that propagating through the pixel groups 502 and 504 looks to pixel groups (e.g., that to the left or above, respectively) that are outside of the target area 206.

Indeed, because the propagation operation for a given pixel group looks to the offsets of neighboring pixel groups, pixel groups along the border of the target region 206 (e.g., pixel groups 502 and 504) look to offsets of neighboring pixel groups that are outside of the target region 206. Thus, considering the cases of pixel groups along the border of the target region 206, the matching patch system 102 further identifies pixels blocks outside of the target region 206 to utilize for determining propagation offsets. To elaborate, the matching patch system 102 seeds the target region by identifying pixel groups around the border of the target region 206. For example, the matching patch system 102 determines matching patches for known pixel groups (e.g., pixel groups that are not part of a target region to be replaced or filled) and utilizes the matching patches of the known pixel groups to determine matching patch offsets. These matching patch offsets serve as the seed for the target region (e.g., the target region 206). Thus, by looking at neighboring pixel groups during the propagation operation, the matching patch system 102 utilizes a ring or rim of pixel groups around the target region 206 as a basis for determining propagation offsets for pixel groups along an edge or border of the target region 206.

Additionally, inn one or more embodiments the matching patch system 102 further utilizes checksum signatures. For example, the matching patch system 102 applies a checksum signature on each input and each output of each of the initialization operation, the propagation operation, and the search operation. In some embodiments, the matching patch system 102 utilizes the same checksum signature regardless of the number of cores for a given hardware architecture. By utilizing checksum signatures, the matching patch system 102 matches the checksum for threaded and non-threaded processes for any number of cores. Utilizing the checksum further improves the matching patch system 102 by providing a bug free output with no reduced quality issues.

Figure 11:
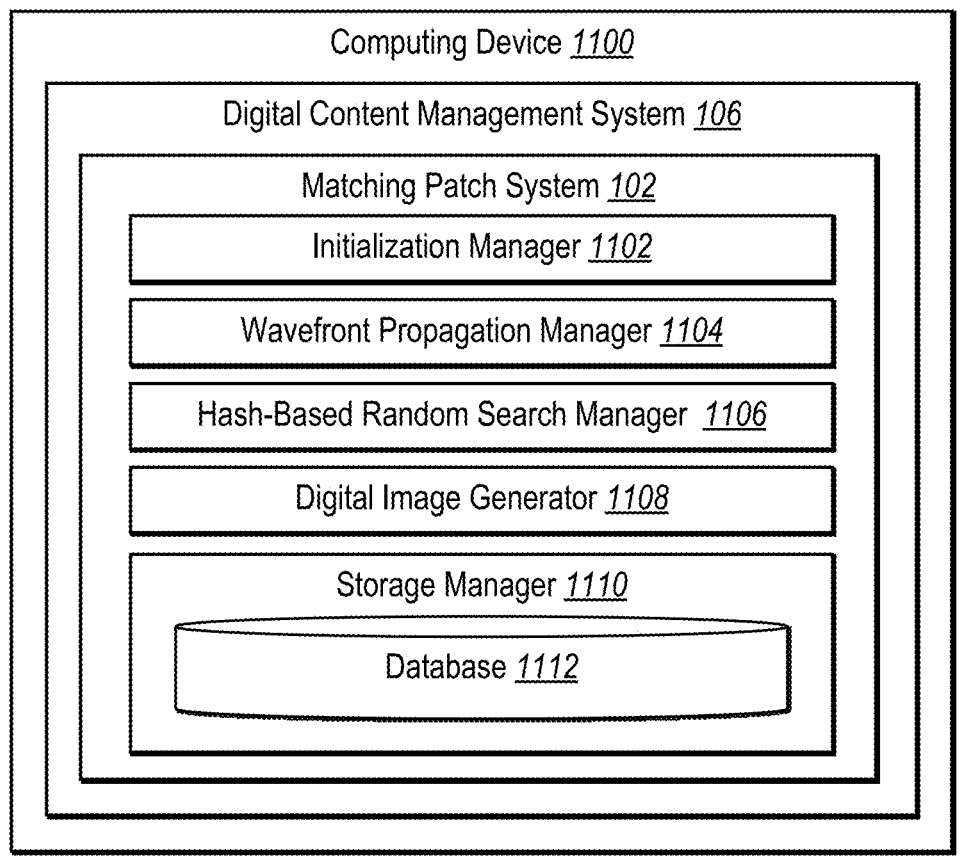
FIG. 11 illustrates a schematic diagram of a matching patch system in accordance with one or more embodiments.

Looking now to FIG. 11, additional detail will be provided regarding components and capabilities of the matching patch system 102. Specifically, FIG. 11 illustrates an example schematic diagram of the matching patch system 102 on an example computing device 1100 (e.g., one or more of the client device 108 and/or the server(s) 104). As shown in FIG. 11, the matching patch system 102 may include an initialization manager 1102, a wavefront propagation manager 1104, a hash-based random search manager 1106, a digital image generator 1108, and a storage manager 1110.

As just mentioned, the matching patch system 102 includes an initialization manager 1102. In particular, the initialization manager 1102 determines, generates, or identifies initial offsets for pixel groups with a target region (e.g., in parallel via a wavefront analysis). Indeed, the initialization manager 1102 generates pixel groups within a target region of a digital image and randomly determines initial offsets for each of the pixel groups. The initialization manager 1102 can communicate with the storage manager 1110 to store initial offsets and indicators (e.g., pixel identifiers) of corresponding pixel groups within the database 1112. In addition, the initialization manager 1102 fills a target region by implementing, utilizing, or applying a ROI fill technique, as described above.

As also mentioned, the matching patch system 102 includes a wavefront propagation manager 1104. The wavefront propagation manager 1104 determines, generates, or identifies propagation offsets for pixel groups within a target region of a digital image. The wavefront propagation manager 1104 can communicate with the storage manager 1110 to store propagation offsets and indicators (e.g., pixel identifiers) of corresponding pixel groups within the database 1112. In addition, the wavefront propagation manager 1104 compares propagation offsets with initial offsets to select, determine, identify, or generate current offsets for pixel groups based on determining which offset is closer to a respective pixel group. As described above, the wavefront propagation manager 1104 can determine multiple propagation offsets for different pixel groups in parallel.

In addition, the matching patch system 102 includes a hash-based random search manager 1106. The hash-based random search manager 1106 determines, generates, or identifies search offsets for pixel groups within a target region of a digital image. For example, the hash-based random search manager 1106 utilizes, implements, or applies a hash-based random search algorithm to generate deterministic search offsets for pixel groups. The hash-based random search manager 1106 can communicate with the storage manager 1110 to store search offsets and indicators (e.g., pixel identifiers) of corresponding pixel groups within the database 1112. In addition, the hash-based random search manager 1106 can track, monitor, detect, determine, or identify various parameters for a sextuple key associated with the hash-based random search algorithm. For example, the hash-based random search manager 1106 can track EM iterations, scales, propagation iterations, search iterations, X coordinates, and Y coordinates, and the hash-based random search manager 1106 can generate sextuple keys based on these parameters. The hash-based random search manager 1106 can further communicate with the storage manager 1110 to store sextuple keys within the database 1112. Further, the hash-based random search manager 1106 compares initial offsets, propagation offsets, search offsets, and/or selected offsets to determine, generate, identify, or select matching patch offsets for pixel groups. As described above, the hash-based random search manager 1106 can determine multiple search offsets for different pixel groups in parallel.

As shown, the matching patch system 102 further includes a digital image generator 1108. In particular, the digital image generator 1108 generates a deterministic enhanced digital image by filling or replacing pixel groups with a target region with matching offset pixel groups. For example, the digital image generator 1108 generates a deterministic enhanced digital image by communicating with the storage manager 1110, the hash-based random search manager 1106, the initialization manager 1102, and/or the wavefront propagation manager 1104 to replace pixel groups within a target region of an original digital image based on respective matching patch offsets.

In one or more embodiments, each of the components of the matching patch system 102 are in communication with one another using any suitable communication technologies. Additionally, the components of the matching patch system 102 can be in communication with one or more other devices including one or more client devices described above. It will be recognized that although the components of the matching patch system 102 are shown to be separate in FIG. 11, any of the subcomponents may be combined into fewer components, such as into a single component, or divided into more components as may serve a particular implementation. Furthermore, although the components of FIG. 11 are described in connection with the matching patch system 102, at least some of the components for performing operations in conjunction with the matching patch system 102 described herein may be implemented on other devices within the environment.

The components of the matching patch system 102 can include software, hardware, or both. For example, the components of the matching patch system 102 can include one or more instructions stored on a computer-readable storage medium and executable by processors of one or more computing devices (e.g., the computing device 1100). When executed by the one or more processors, the computer-executable instructions of the matching patch system 102 can cause the computing device 1100 to perform the methods described herein. Alternatively, the components of the matching patch system 102 can comprise hardware, such as a special purpose processing device to perform a certain function or group of functions. Additionally or alternatively, the components of the matching patch system 102 can include a combination of computer-executable instructions and hardware.

Furthermore, the components of the matching patch system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the matching patch system 102 may be implemented as part of a stand-alone application on a personal computing device or a mobile device. Alternatively or additionally, the components of the matching patch system 102 may be implemented in any application that allows creation and delivery of marketing content to users, including, but not limited to, applications in ADOBE CREATIVE CLOUD such as ADOBE ILLUSTRATOR, ADOBE PHOTOSHOP, or ADOBE PREMIERE. "ADOBE," "ILLUSTRATOR," "PHOTOSHOP," and "PREMIERE" are registered trademarks of Adobe Inc. in the United States and/or other countries.

FIGS. 1-11, the corresponding text, and the examples provide a number of different systems, methods, and non-transitory computer readable media for generating deterministic enhance digital images based on parallel determinations of pixel group offsets. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
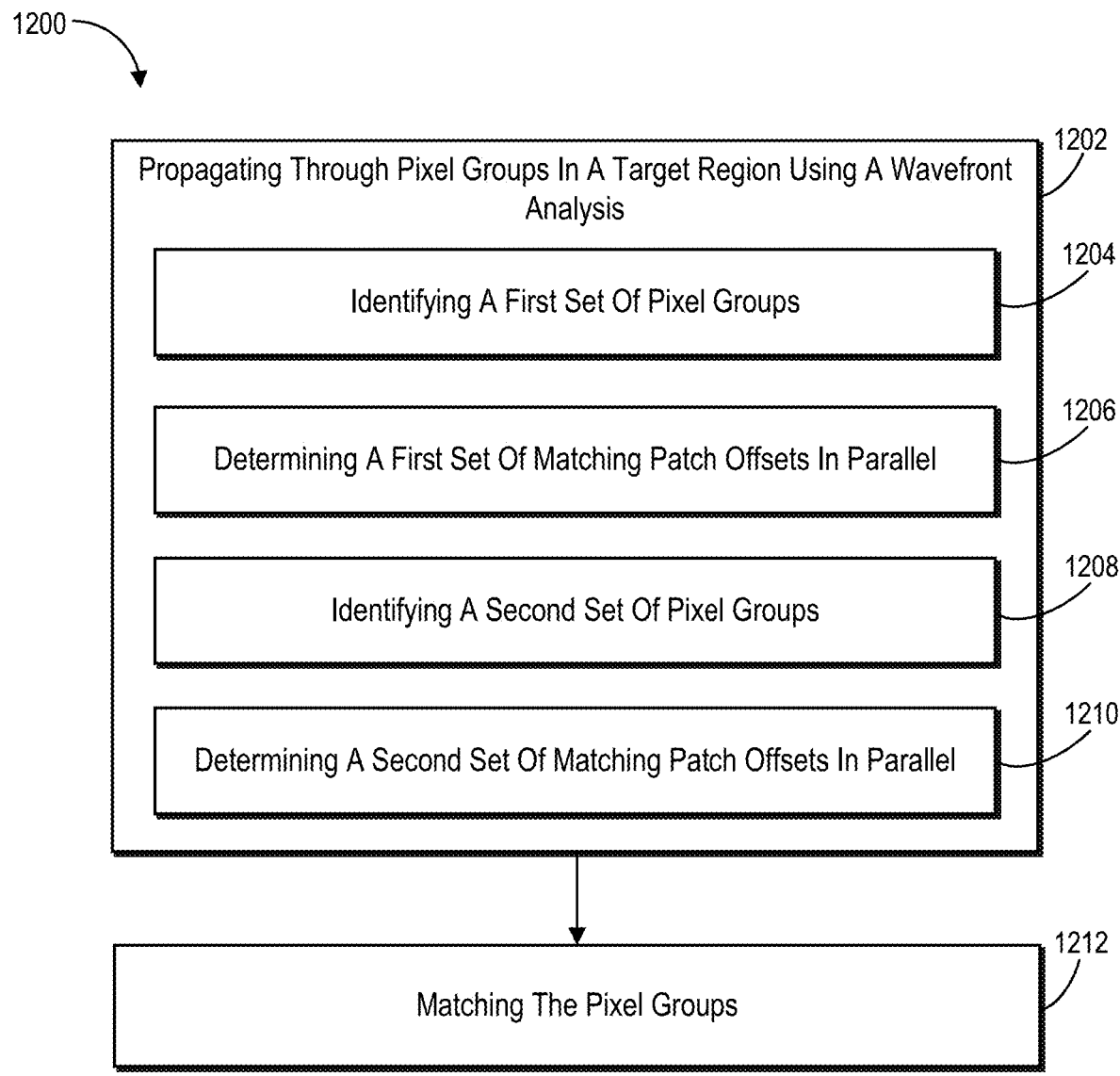
FIG. 12 illustrates an example flowchart of a series of acts for determining matching patch offsets for generating a deterministic enhanced digital image in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 of determining matching patch offsets to generate a deterministic enhanced digital image. The series of acts 1200 includes an act 1202 of propagating through pixel groups in a target region using a wavefront analysis. In particular the act 1202 includes propagating through pixel groups in a target region of a digital image using a parallel wave analysis to determine matching patch offsets for the pixel groups in the target region. Indeed, the act 1202 can involve generating, in parallel via threads of at least one processor, a deterministic matching patch offset for each pixel group of the set of pixel groups.

Each pixel group can include a plurality of pixels, and the series of acts 1200 can include an act of determining matching patch offsets for pixels within the pixel group serially. Further, each pixel group can correspond to an atomic counter, and the series of acts 1200 can include an act of utilizing the atomic counter as part of a scoped dependency grid array to determine that one or more pixel groups in the second set of pixel blocks is ready for processing by decrementing the atomic counter in response to completing analysis for pixel groups on which the one or more pixel groups depends. The at least one processor is can include graphical processing unit. In addition, the parallel wave analysis can proceed from top left to bottom right. Alternatively, the parallel wave analysis can proceed from bottom right to top left.

The act 1202 can further involve multiple additional acts. For example, the act 1202 can include an act 1204 of identifying a first set of pixel groups. In particular, the act 1204 can include identifying a first set of pixel groups along a first pixel wave within the target region of the digital image. For example, the act 1204 can involve determining one or more propagation offsets corresponding to previously-propagated pixel groups.

In addition, the act 1202 can involve an act 1206 of determining a first set of matching patch offsets in parallel. In particular, the act 1206 can include, for each pixel group of the first set of pixel groups, determining, in parallel via the threads of the at least one processor, a first set of matching patch offsets based on one or more previously-propagated pixel groups. The at 1206 can also involve utilizing a hash-based random search algorithm to identify one or more deterministic search offsets within a search area of the digital image. The act 1206 can further involve generating a deterministic matching patch offset based on comparing the one or more propagation offsets and the one or more deterministic search offsets.

Further, the act 1202 can involve an act 1208 of identifying a second set of pixel groups. In particular, the act 1208 can include identifying a second set of pixel groups along a second pixel wave within the target region of the digital image. The first pixel wave and the second pixel wave can include diagonally adjacent pixel groups within the target region of the digital image. Additionally, the first pixel wave can be adjacent to the second pixel wave in the target region of the digital image. Each pixel group of the first set of pixel groups and the second set of pixel groups can include or be associated with an atomic counter. In addition, the series of acts 1200 can include an act of, for each pixel group of the first set of pixel groups and the second set of pixel groups, utilizing the atomic counter to decrement an iteration count in response to determining a corresponding matching patch offset.

As shown, the act 1202 can still further involve an act 1210 of determining a second set of matching patch offsets in parallel. In particular, the act 1210 can include, for each pixel group of the second set of pixel groups, determining, in parallel via the threads of the at least one processor, a second set of matching patch offsets based on one or more pixel groups of the first set of pixel groups. For example, the act 1210 can involve determining one or more propagation offsets corresponding to the one or more pixel groups of the first set of pixel groups and utilizing a hash-based random search algorithm to determine one or more deterministic search offsets within a search area of the digital image.

The act 1210 can also (or alternatively) include determining a first matching patch offset from a top pixel group of the first set of pixel groups located above the pixel group, and determining a second matching patch offset from a left pixel group located to the left of the pixel group. In addition (or alternatively), the act 1210 can involve determining a first matching patch offset from a bottom pixel group of the first set of pixel groups located below the pixel group, and determining a second matching patch offset from a right pixel group located to the right of the pixel group.

In some embodiments, the act 1210 can involve, for each pixel group of the second set of pixel groups: determining one or more propagation offsets corresponding to the one or more pixel groups of the first set of pixel groups and utilizing a hash-based random search algorithm to determine one or more deterministic search offsets within a search area of the digital image. The act 1210 can further involve, for each pixel group of the second set of pixel groups: comparing the one or more initial offsets with the one or more propagation offsets and determining, based on the comparison, a selected offset for the pixel group between the one or more initial offsets and the one or more propagation offsets. Additionally, the act 1210 can involve, for each pixel group of the second set of pixel groups: comparing the selected offset with the one or more deterministic search offsets and determining the matching patch offset based on the comparison of the selected offset with the one or more deterministic search offsets. Indeed, the act 1210 can involve generating, in parallel via the threads of the at least one processor, a deterministic matching patch offset for each pixel group of the second set of pixel groups by: determining a set of propagation offsets based on one or more pixel groups of the set of pixel groups, utilizing the hash-based random search algorithm to identify a set of deterministic search offsets within a search area of the digital image, and generating the deterministic matching patch offset based on comparing the set of propagation offsets and the set of deterministic search offsets.

The act 1210 can further involve an act of identifying the search area as an area within the digital image centered around the deterministic matching patch offset, an act of utilizing the hash-based random search algorithm to randomly sample pixel groups within the search area, and an act of assigning the sampled pixel groups as deterministic search offsets.

In addition, the series of acts 1200 includes an act 1212 of matching the pixel groups. In particular, the act 1212 includes, for each pixel group of the second set of pixel groups, matching the pixel group to a corresponding pixel group from the digital image based on the second set of matching patch offsets.

Although not illustrated in FIG. 12, the series of acts 1200 can further include an act of initializing the pixel groups in the first set and the second set by randomly determining, for each pixel group in the first set and the second set, one or more initial offsets. The series of acts 1200 can also include an act of generating a deterministic enhanced digital image by filling the target region. For example, the series of acts 1200 can include an act of generating a deterministic enhanced digital image by filling the target region based on the one or more propagation offsets and the one or more deterministic search offsets for each pixel group. The series of acts 1200 can also include an act of determining, for each pixel group of the set of pixel groups, a unique computation key. Additionally, the series of acts 1200 can include an act of, for each pixel group of the set of pixel groups, applying the hash-based random search algorithm to the unique computation key to select the deterministic search offset from within the search area of the digital image.

The series of acts 1200 can further include an act of selecting a size of a pixel group within the set of pixel groups based on a type of search method. Selecting the size can involve an act of selecting a first size based on a translation search method and an act of selecting a second size based on a similarity transform search method. The series of acts 1200 can also include an act of, for each pixel group of the set of pixel groups, generating, in parallel via the threads of the at least one processor, a second deterministic matching patch offset, wherein the deterministic matching patch offset matches the second deterministic matching patch offset. The series of acts 1200 can still further include an act of generating a second deterministic enhanced digital image by, for each pixel group of the set of pixel groups, filling the target region based on the second deterministic matching patch offset, wherein the deterministic enhanced digital image matches the second deterministic enhanced digital image. The series of acts 1200 can also include an act of, in response to receiving a second request to generate a second deterministic enhanced digital image by filling the target region of the digital image, generating a second deterministic enhanced digital image that matches the deterministic enhanced digital image.

Figure 13:
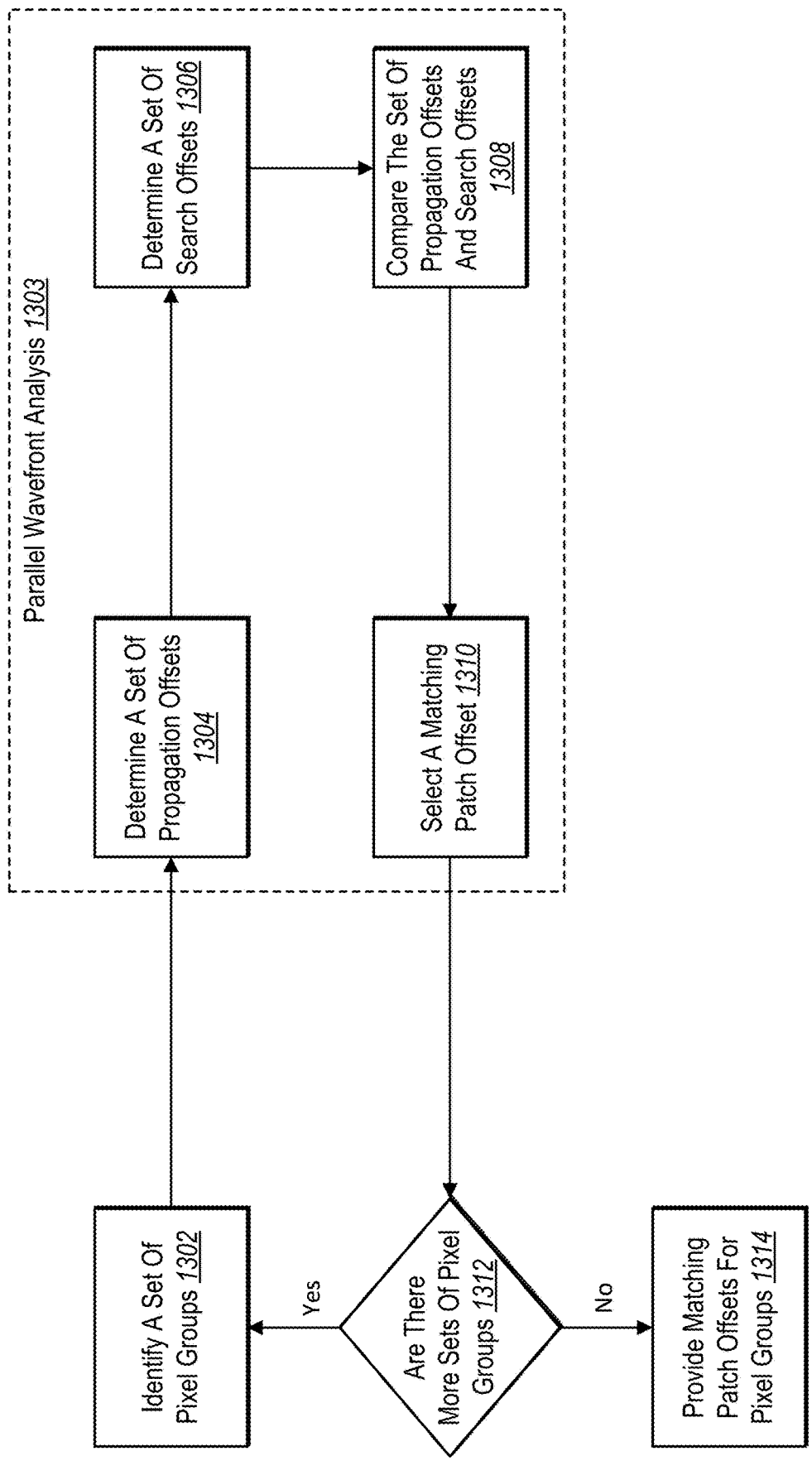
FIG. 13 illustrates an example flowchart of a series of acts in a step for propagating through pixel groups in a target region of the digital image using a parallel wave analysis to generate deterministic matching patch offsets for the pixel groups in the target region.

As mentioned, the matching patch system 102 can perform a step for propagating through pixel groups in a target region of the digital image using a parallel wave analysis to generate deterministic matching patch offsets for the pixel groups in the target region. For example, FIG. 13 illustrates a series of acts 1302-1314 involved in the step for propagating through pixel groups in a target region of the digital image using a parallel wave analysis to generate deterministic matching patch offsets for the pixel groups in the target region. In addition to (or in the alternative to) the acts and algorithms described in FIG. 13, the algorithms and acts described in relation to FIGS. 3-10 can provide the corresponding structure for a step for propagating through pixel groups in a target region of the digital image using a parallel wave analysis to generate deterministic matching patch offsets for the pixel groups in the target region.

In particular, the matching patch system 102 performs an act 1302 to identify a set of pixel groups. For example, the matching patch system 102 identifies a set of pixel groups with a target region of a digital image. In some embodiments, though not illustrated in FIG. 13, the matching patch system 102 further performs an act to initialize the pixel groups by determining an initial offset for each pixel group within the target region.

As shown, the matching patch system 102 also performs several acts 1304-1310 as part of a parallel wavefront analysis 1303. For example, the matching patch system 102 performs an act 1304 to determine a set of propagation offsets. In particular, and as described above, the matching patch system 102 determines, in parallel for a set of pixel groups within a given pixel wave, offsets associated with neighboring pixel groups. Additionally, the matching patch system 102 compares, for the set of pixel groups, the corresponding initial offsets with the propagation offsets to determine which offset are closer to the respective pixel groups.

The matching patch system 102 further performs an act 1306 to determine a set of search offsets in parallel. In particular, and as described above, the matching patch system 102 utilizes, for a set of pixel groups within a given pixel wave, a hash-based random search algorithm to identify search offsets (or multiple search offsets) within a search area of the digital image. Additionally, the matching patch system 102 performs an act 1308 to compare the set of propagation offsets with the set of search offsets in parallel. For example, the matching patch system 102 determines which offset is the closest match to a given pixel group. Based on the comparison, the matching patch system 102 performs an act 1310 to select a matching patch offset. In particular, the matching patch system 102 selects the closest matching offset as the matching patch offset for a pixel group.

As illustrated, the matching patch system 102 further performs an act 1312 to determine whether there are more pixel groups to analyze within the target region. In particular, the matching patch system 102 determines whether there are additional pixel waves that include pixel groups for which the matching patch system 102 has yet to propagate through to determine matching patch offsets. If there are more pixel waves that include sets of pixel groups, the matching patch system 102 repeats acts 1302-1310. Alternatively, if there are no more sets of pixel groups, the matching patch system 102 proceeds to perform act 1314 to provide the matching patch offsets for the pixel groups of the target region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
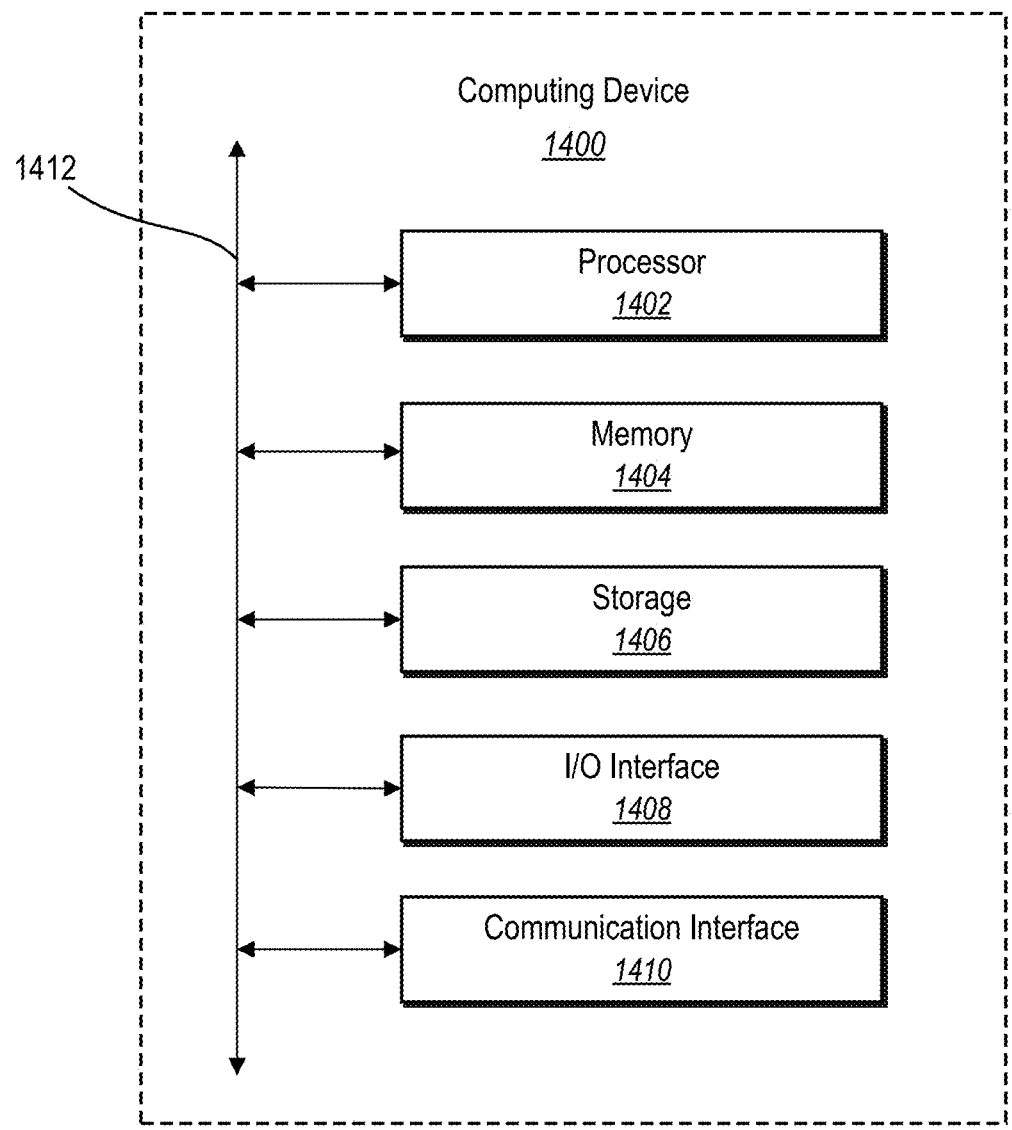
FIG. 14 illustrates a block diagram of an example computing device in accordance with one or more embodiments.

FIG. 14 illustrates, in block diagram form, an example computing device 1400 (e.g., the computing device 1400, the client device 108, and/or the server(s) 104) that may be configured to perform one or more of the processes described above. One will appreciate that the matching patch system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor comprising threads, cause a computer device to:
   propagate through pixel groups in a target region of a digital image using a parallel wave analysis to determine matching patch offsets for the pixel groups in the target region by:
      identifying a first set of pixel groups along a first pixel wave within the target region of the digital image;
      for each pixel group of the first set of pixel groups, determining, in parallel via the threads of the at least one processor, a first set of matching patch offsets based on one or more previously-propagated pixel groups;
      identifying a second set of pixel groups along a second pixel wave within the target region of the digital image; and
      for each pixel group of the second set of pixel groups, determining, in parallel via the threads of the at least one processor, a second set of matching patch offsets based on one or more pixel groups of the first set of pixel groups; and
   for each pixel group of the second set of pixel groups, match the pixel group to a corresponding pixel group from the digital image based on the second set of matching patch offsets.

2. The non-transitory computer readable medium of claim 1, wherein:
   the parallel wave analysis proceeds from top left to bottom right; and
   determining, for each pixel group, the second set of matching patch offsets from the one or more pixel groups comprises determining a first matching patch offset from a top pixel group of the first set of pixel groups located above the pixel group, and determining a second matching patch offset from a left pixel group located to the left of the pixel group.

3. The non-transitory computer readable medium of claim 1, wherein:
   the parallel wave analysis proceeds from bottom right to top left; and
   determining, for each pixel group, the second set of matching patch offsets from the one or more pixel groups comprises determining a first matching patch offset from a bottom pixel group of the first set of pixel groups located below the pixel group, and determining a second matching patch offset from a right pixel group located to the right of the pixel group.

4. The non-transitory computer readable medium of claim 1, wherein each pixel group comprises a plurality of pixels, and further comprising, for each pixel group, determining matching patch offsets for pixels within the pixel group serially.

5. The non-transitory computer readable medium of claim 1, wherein each pixel group corresponds to an atomic counter and further comprising utilizing the atomic counter as part of a scoped dependency grid array to determine that one or more pixel groups in the second set of pixel groups is ready for processing by decrementing the atomic counter in response to completing analysis for pixel groups on which the one or more pixel groups depends.

6. The non-transitory computer readable medium of claim 1, wherein determining, in parallel via the threads of the at least one processor, the second set of matching patch offsets comprises, for each pixel group of the second set of pixel groups:
   determining one or more propagation offsets corresponding to the one or more pixel groups of the first set of pixel groups; and
   utilizing a hash-based random search algorithm to determine one or more deterministic search offsets within a search area of the digital image.

7. The non-transitory computer readable medium of claim 6, further comprising instructions that, when executed by the at least one processor, cause the computer device to generate a deterministic enhanced digital image by filling the target region based on the one or more propagation offsets and the one or more deterministic search offsets for each pixel group.

8. The non-transitory computer readable medium of claim 1, wherein the first pixel wave and the second pixel wave comprise diagonally adjacent pixel groups within the target region of the digital image.

9. The non-transitory computer readable medium of claim 1, wherein the first pixel wave is adjacent to the second pixel wave in the target region of the digital image.

10. A system comprising:
    at least one processor comprising threads; and
    a non-transitory computer readable medium comprising instructions that, when executed by the at least one processor, cause the system to:
    identify a set of pixel groups along a pixel wave within a target region of a digital image; and
    generate, in parallel via the threads of the at least one processor, a deterministic matching patch offset for each pixel group of the set of pixel groups by, for each pixel group by:
       determining one or more propagation offsets corresponding to previously-propagated pixel groups;
       utilizing a hash-based random search algorithm to identify one or more deterministic search offsets within a search area of the digital image; and
       generating the deterministic matching patch offset based on comparing the one or more propagation offsets and the one or more deterministic search offsets; and
    generate a deterministic enhanced digital image by filling the target region based on the deterministic matching patch offset for each pixel group of the set of pixel groups.

11. The system of claim 10, further comprising instructions that, when executed by the at least one processor, cause the system to:
    identify a second set of pixel groups along a second pixel wave within the target region of the digital image; and
    generate, in parallel via the threads of the at least one processor, a deterministic matching patch offset for each pixel group of the second set of pixel groups by, for each pixel group in the second set of pixel groups:
       determining a set of propagation offsets based on one or more pixel groups of the set of pixel groups;

utilizing the hash-based random search algorithm to identify a set of deterministic search offsets within a search area of the digital image; and generating the deterministic matching patch offset based on comparing the set of propagation offsets and the set of deterministic search offsets.

12. The system of claim 10, further comprising instructions that, when executed by the at least one processor, cause the system to determine, for each pixel group of the set of pixel groups, a unique computation key.

13. The system of claim 12, further comprising instructions that, when executed by the at least one processor, cause the system to, for each pixel group of the set of pixel groups, apply the hash-based random search algorithm to the unique computation key to select the deterministic search offset from within the search area of the digital image.

14. The system of claim 10, wherein utilizing the hash-based random search algorithm to identify one or more deterministic search offsets within the search area of the digital image comprises:

identifying the search area as an area within the digital image centered around the deterministic matching patch offset; and utilizing the hash-based random search algorithm to randomly sample the deterministic search offsets.

15. The system of claim 10, further comprising selecting a size of a pixel group within the set of pixel groups based on a type of search method.

16. The system of claim 15, wherein selecting the size comprises:

selecting a first size based on a translation search method; and selecting a second size based on a similarity transform search method.

17. In a digital medium environment for editing digital images, a computer-implemented method filling target regions using patch matching and generating deterministic enhanced digital images comprising:

receiving a request to generate a deterministic enhanced digital image by filling a target region of a digital image;

a step for propagating through pixel groups in a target region of the digital image using a parallel wave analysis to generate deterministic matching patch offsets for the pixel groups in the target region;

identifying a set of deterministic matching patch pixel groups for the pixel groups in the target region based on the deterministic matching patch offsets; and generating the deterministic enhanced digital image by filling the target region based on the set of deterministic matching patch pixel groups.

18. The method of claim 17, wherein the pixel groups are arranged, diagonally adjacent to one another, along a pixel wave within the target region of the digital image, and wherein the pixel wave is adjacent to one or more additional pixel waves within the target region.

19. The method of claim 18, wherein each of the pixel groups comprises a two-by-two square of pixels.

20. The method of claim 17, further comprising, in response to receiving a second request to generate a second deterministic enhanced digital image by filling the target region of the digital image, generating a second deterministic enhanced digital image that matches the deterministic enhanced digital image.

* * * * *